(12) United States Patent
Taira et al.

(10) Patent No.: US 9,360,637 B2
(45) Date of Patent: Jun. 7, 2016

(54) OPTICAL CONNECTOR PLUG

(71) Applicant: SEIKOH GIKEN CO., LTD., Chiba (JP)

(72) Inventors: Junji Taira, Chiba (JP); Norimasa Arai, Chiba (JP); Masayuki Jibiki, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 17 days.

(21) Appl. No.: 14/626,228

(22) Filed: Feb. 19, 2015

(65) Prior Publication Data

US 2015/0253517 A1 Sep. 10, 2015

(30) Foreign Application Priority Data

Mar. 10, 2014 (JP) ................. 2014-064674
Oct. 3, 2014 (JP) ................. 2014-204709

(51) Int. Cl.
G02B 6/38 (2006.01)

(52) U.S. Cl.
CPC ............ *G02B 6/3869* (2013.01); *G02B 6/3893* (2013.01)

(58) Field of Classification Search
CPC ............................. G02B 6/3869; G02B 6/3893
See application file for complete search history.

(56) References Cited

U.S. PATENT DOCUMENTS

| 4,268,115 | A | * | 5/1981 | Slemon et al. | 385/88 |
| 4,684,205 | A | * | 8/1987 | Margolin et al. | 385/68 |
| 4,712,864 | A | * | 12/1987 | Ellis et al. | 385/59 |
| 5,121,454 | A | * | 6/1992 | Iwano et al. | 385/60 |
| 5,404,416 | A | * | 4/1995 | Iwano et al. | 385/60 |
| 6,206,581 | B1 | | 3/2001 | May | |
| 6,293,710 | B1 | | 9/2001 | May | |
| 2012/0170896 | A1 | * | 7/2012 | Skluzacek et al. | 385/81 |
| 2012/0243832 | A1 | | 9/2012 | Yokomachi | |
| 2013/0322826 | A1 | * | 12/2013 | Henke et al. | 385/60 |

FOREIGN PATENT DOCUMENTS

| JP | 63078906 U1 | 5/1988 |
| JP | 2012-018283 | 1/2012 |

\* cited by examiner

*Primary Examiner* — Peter Radkowski
(74) *Attorney, Agent, or Firm* — Rankin, Hill & Clark LLP

(57) ABSTRACT

In the optical connector plug, a length from the end face of the capillary of the ferrule to the front end surface of the flange in the axial direction is larger than a length from the front end of the forward portion of the first accommodation space of the plug frame to the rear end surface of the rearward portion of the plug frame in the axial direction, and in a state in which the front end surface of the flange is in contact with the rear end surface of the plug frame, the end face of the capillary is located in the second accommodation space.

5 Claims, 23 Drawing Sheets

OPTICAL CONNECTOR PLUG

CROSS-REFERENCE TO RELATED APPLICATION

This patent specification is based on Japanese patent application, No. 2014-204709 filed on Mar. 10, 2014 in the Japan Patent Office, the entire contents of which are incorporated by reference herein.

BACKGROUND

1. Technical Field

The present invention relates to an optical connector plug to make an optical connection between optical fibers.

2. Description of the Related Art

An optical fiber used in optical communication performs an optical connection using an optical connector. The optical connector is comprised of an optical connector plug in which an end of the optical fiber is held, and an optical connector adapter to perform, an optical connection between the optical fibers while the optical connector plugs are fixed. As such an optical connector, there is a SC type optical connector (IEC 61754-4) to perform optical connection using a capillary (ferrule cylindrical member) whose outer diameter is approximately 2.5 mm for holding the optical fiber, or a LC type optical connector (IEC 61754-20) to perform optical connection using a capillary (ferrule cylindrical member) whose outer diameter is approximately 1.25 mm for holding an optical fiber or the like.

In FIG. 2 and FIG. 5 of the U.S. Pat. No. 6,293,710 (hereinafter referred to as patent document 1), an optical connector plug in which a ferrule holding an optical fiber inside thereof is inserted in a plug frame, a spring (coil spring) is provided between the ferrule and a stop ring, and the plug frame and the stop ring are engaged and fixed so as to assemble is disclosed. In the optical connector plug disclosed in the patent document 1, a flange of the ferrule and the spring are accommodated in a first accommodation space of the plug frame, and the capillary of the ferrule is accommodated in a second accommodation space of the plug frame.

When a single-mode optical fiber is used, after the core eccentricity direction of the optical fiber is checked and it is determined that the orientation thereof is the position around the axis of the ferrule, the assembly of the optical connector plug is performed while confirming the position around the axis of the ferrule with respect to the plug frame. Further, when an angle polishing processing of the end face of the ferrule (such as an angled PC polishing) is performed, the assembly of the optical connector plug is performed in a state in which the position around the axis of the ferrate is aligned with respect to the plug frame.

In paragraphs "0048", "0050", "0069", "0072" and "0080" and FIGS. 11, 13 and 18 of the United States Patent Application Publication No. US2012/0243832 (hereinafter referred to as patent document 2), an optical connector plug in which a ferrule including a flange of asymmetrical shape with respect to the vertical direction is included and a ferrule accommodation space to accommodate the ferrule of the optical connector plug has a shape corresponding to the flange is disclosed. Further, a method in which when such an optical connector plug is assembled, a dust cap attached with a string is covered on the ferrule, the dust cap attached with the string is passed through the plug frame so that the ferrule is inserted into the plug frame is disclosed.

SUMMARY

An optical connector plug, includes: a ferrule, holding at least one optical fiber extending in an axial direction; a plug frame to accommodate the ferrule; a stop ring to engage with the plug frame; and a spring provided between the ferrule and the stop ring to bias the ferrule forward in the axial direction, wherein the ferrule includes a capillary having an end face from which the optical fiber is exposed forward in the axial direction, and a flange located at the rearward portion of the capillary in the axial direction and extending outward in the radial direction from the capillary, and the plug frame includes an insertion port located at the rearward portion of the plug frame in the axial direction to insert the ferrule, a first accommodation space extending forward in the axial direction from the insertion port to accommodate the flange and the spring, and a second accommodation space extending from the front end of the forward portion of the first accommodation space to the front end of the forward portion of the plug frame in the axial direction in which the capillary is located, and a flange contact surface extending to inward in the radial direction from the front end of the forward portion of the first accommodation space in the axial direction is formed at the rearward portion of the second accommodation space in the axial direction, in the optical connector plug, a length from the end face of the capillary of the ferrule to the front end surface of the flange in the axial direction is larger than a length from the front end of the forward portion of the first accommodation space of the plug frame to the rear end surface of the rearward portion of the plug frame in the axial direction, and a cross-sectional shape of the first accommodation space of the plug frame is substantially same as the shape of the flange, the flange is fitted to the first accommodation space so that the flange can be moved in the axial direction and cannot be rotated around the axis.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
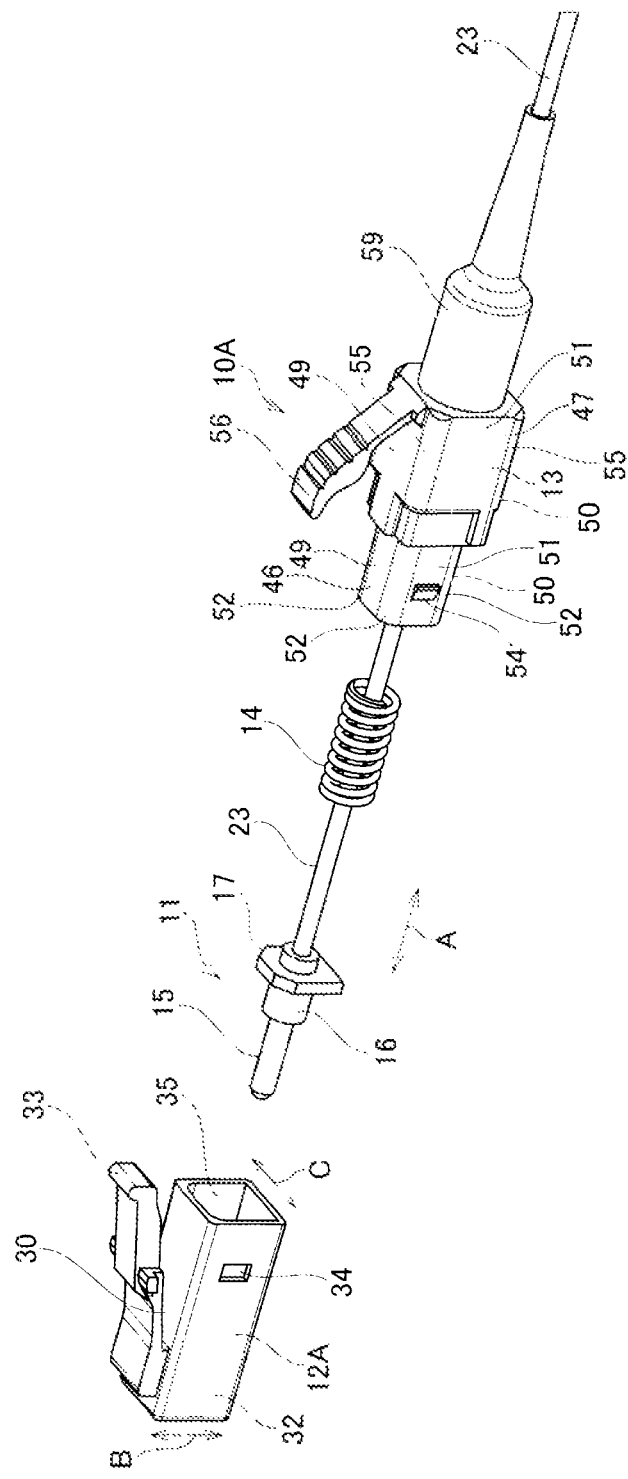
FIG. 1 is an exploded perspective view of an optical connector plug shown as an example.

In the following detailed description, for purpose of explanation, numerous specific details are set forth in order to provide a thorough, under standing of the disclosed embodiments. It will be apparent, however, that one or more embodiments may be practiced without these specific details. In other instances, well-known structures and devices are schematically shown in order to simplify the drawing.

In the optical connector plug disclosed in the Patent document 1, in a state immediately after the flange of the ferrule enters into the plug frame, the end face of the capillary of the ferrule does not reach the second accommodation space of the plug frame, and the capillary of the ferrule can be inclined greatly in the radial direction in the first accommodation space of the plug frame. When the ferrule is inserted further in the axial direction of the plug frame in the state in which the capillary is inclined in the radial direction in the first accommodation space, the end face of the capillary comes in contact with the front end (flange contact surface) of the forward portion, of the first accommodation space of the plug frame in the axial direction, accordingly, it is not possible to insert the ferrule smoothly into the plug frame. Further, when the optical connector plug disclosed in the Patent document 2 is assembled, it is necessary to prepare a dust cap having a string in advance.

When the core eccentric direction of the optical fiber is checked, or the angle polishing processing of the end surface of the ferrule is performed, it is necessary to assemble the optical connector plug while aligning the position around the axis of the ferrule with respect to the plug frame. In the optical connector plug disclosed in the Patent document 1, in a state immediately after the flange of the ferrule enters in the plug frame, the rotation about the axis of the ferrule is not restricted so that the ferrule can be rotated in the first accommodation space of the plug frame, accordingly, there may be a case in which the position about the axis of the ferrule is deviated with respect to the plug frame.

In the actual assembly of the optical connector plug in the construction field of a buffered optical fiber, since the ferrule is inserted into the plug frame while holding the optical fiber extending rearward from the ferrule, it is needed to define the aim to the insertion port of the plug frame precisely and to insert the ferrule in the plug frame without rotating about the axis. Therefore, it requires effort and time for the assembly of the optical connector plug depending on the working environment of the construction field of the optical fiber, and there may be a case in which it is not possible to assemble the optical connector plug in a short time without requiring effort.

The object of the present invention is to provide an optical connector plug with which it is possible to insert the ferrule smoothly into the plug frame without attaching the dust cap having a string, etc., and to assemble in a short time without requiring effort. Further, another object of the present invention is to provide an optical connector plug with which it is possible to easily perform the alignment of the position, around the axis of the ferrule with respect to the plug frame and accommodate the ferrule in the plug frame in a state in which the position around the axis of the ferrule is matched with respect to the plug frame.

This patent specification describes a novel optical connector plug which includes a ferrule holding at least one optical fiber extending in an axial direction, a plug frame to accommodate the ferrule, a stop ring to engage with the plug frame, and a spring provided between the ferrule and the stop ring to bias the ferrule forward in the axial direction, and the optical connector plug is characterized in that the ferrule includes a capillary having an end face from which the optical fiber is exposed forward in the axial direction, and a flange located at the rearward portion of the capillary in the axial direction and extending outward in the radial direction from the capillary, and the plug frame includes an insertion port located at the rearward portion thereof in the axial direction to insert the ferrule, a first accommodation space extending forward in the axial direction from the insertion port to accommodate the flange and the spring, and a second accommodation space extending from the front end of the forward portion of the first accommodation space in the axial direction to the front end of the forward portion of the plug frame in the axial direction in which the capillary is located, and a flange contact surface extending to inward in the radial direction from the front end of the forward portion of the first accommodation space in the axial direction is formed at the rearward portion of the second accommodation space in the axial direction, in the optical connector plug, a length from the end face of the capillary of the ferrule to the front end surface of the flange in the axial direction is larger than a length from the front end of the forward portion of the first accommodation space of the plug frame to the rear end surface of the rearward portion of the plug frame in the axial direction, and a cross-sectional shape of the first accommodation space is substantially same as the shape of the flange, and the flange is fitted to the first accommodation space so that the flange can be moved in the axial direction and cannot be rotated around the axis.

As an example of the optical connector plug of the present invention, in the optical connector plug, both the shape of the flange and the cross-sectional shape of the first accommodation space are polygon.

Further, as another example of the optical connector plug of the present invention, in the optical connector plug, both the shape of the flange and the cross-sectional shape of the first accommodation space are quadrilateral.

Further, as another example of the optical connector plug of the present invention, in the optical connector plug, both in the polygonal or quadrilateral shape of the flange and the polygonal or quadrilateral cross-sectional shape of the first accommodation space of the plug frame, at least one corner is chamfered.

According to the optical connector plug of the present invention, there are excellent advantages.

The length from the end face of the capillary of the ferrule to the front end surface of the flange in the axial direction is larger than the length from the front end of the forward portion of the first accommodation space of the plug frame to the rear end surface of the rearward portion of the plug frame in the axial direction, in a state in which the front end surface of the flange is in contact with the rear end surface of the plug frame, the end face of the capillary is located in the second accommodation space, accordingly, differently from the optical connector plug disclosed in the Patent document 1 and the optical connector plug disclosed in the Patent document 2, when the ferrule is inserted in the plug frame, the end face of the capillary of the ferrule is located in the second accommodation space beyond the front end surface of the first accommodation space (flange contact surface), and the end face of the capillary cannot come in contact with the front end of the first accommodation space (flange contact surface), therefore, it is possible to insert the ferrule smoothly to the plug frame, the flange of the ferrule and the spring can be easily accommodated in the first accommodation space, and the capillary of the ferrule can be easily located in the second accommodation space.

In the optical connector plug, since the end face of the capillary cannot come in contact with the front end of the first accommodation space (the flange contact surface), it is possible to prevent the end surface of the optical fiber and the end face of the ferrule from scratching, consequently, it is possible to avoid the malfunction of the optical connection due to the scratching of the end surface of the optical fiber and the end face of the ferrule.

In the optical connector plug, since it is possible to insert the ferrule smoothly in the plug frame, it is possible to assemble in the construction field of the optical fiber in a short time without requiring effort. Consequently, it is possible to perform the optical connection work of the optical fiber efficiently.

In the optical connector plug in which the shape of the flange is substantially same as the cross-sectional shape of the first accommodation space of the plug frame, and the flange is fitted to the first accommodation space in a condition in which the flange can be moved in the axial direction in the first accommodation space and cannot be rotated about the axis, when the flange is opposed to the first accommodation space so that the shape of the flange matches with the cross-sectional shape of the first accommodation space in the axial direction and the flange can enter in the first accommodation space, the flange is fitted to the first accommodation space so that the flange can be moved in the axial direction in the first accommodation space and cannot be rotated about the axis, accordingly, by inserting the flange of the ferrule in the first accommodation space, the rotation of the flange around the axis is prevented, the position around the axis of the ferrule is inevitably determined with respect to the plug frame, therefore, it is possible to omit the positioning around the axis of the ferrule with respect to the plug frame, consequently, it is possible to assemble the optical connector plug in a short time without requiring effort.

In the optical connector plug, since the rotation around the axis of the flange is disabled when the ferrule of the flange is fitted in the first accommodation space, it is possible to accommodate the ferrule in the plug frame in a state in which the position around the axis of the ferrule is matched with respect to the plug frame while preventing positional displacement around the axis of the ferrule with respect to the plug frame.

In the optical connector plug in which the shape of the flange and the cross-sectional shape of the first accommodation space of the plug frame are both polygonal or quadrilateral, when the flange is opposed to the first accommodation space so that the flange of polygonal shape or quadrilateral shape matches with the first accommodation space of polygonal shape or quadrilateral shape to face in the axial direction, the flange is fitted to the first accommodation space so that the flange can be moved in the axial direction and cannot be rotated around the axis, accordingly, by inserting the flange of the ferrule in the first accommodation space, the position around the axis of the ferrule is inevitably determined with respect to the plug frame, therefore, it is possible to omit the positioning around the axis of the ferrule with respect to the plug frame, consequently, it is possible to assemble the optical connector plug in a short time without requiring effort. In the optical connector plug, since the rotation around the axis of the flange is disabled when the flange of polygon or quadrilateral shape is fitted to the first accommodation space of polygonal or quadrilateral shape, accordingly, it is possible that the ferrule can be accommodated in the plug frame, in a state in which the position around the axis of the ferrule is matched with respect to the plug frame, while preventing positional displacement around the axis of the ferrule with respect to the plug frame.

In the optical connector plug in which both the shape of the flange and the cross-sectional shape of the first accommodation space of the plug frame include a chamfered shape in at least one corner, when the ferrule is inserted into the plug frame, it is possible to smoothly insert the chamfered corner of the flange of polygonal or quadrilateral shape to the chamfered corner of the first accommodation space of polygonal or quadrilateral shape, therefore, it is possible to perform the optical connection work of the optical fiber efficiently.

In the optical connector plug, since when the flange of polygonal or quadrilateral shape having a chamfered shape is fitted to the first accommodation space of the polygonal shape or quadrilateral shape having a chamfered shape, the rotation around the axis of the flange becomes disabled, accordingly, it is possible to accommodate the ferrule in the plug frame in a state in which the position around the axis of the ferrule is matched with respect to the plug frame, while preventing positional displacement around the axis of the ferrule with respect to the plug frame.

Figure 2:
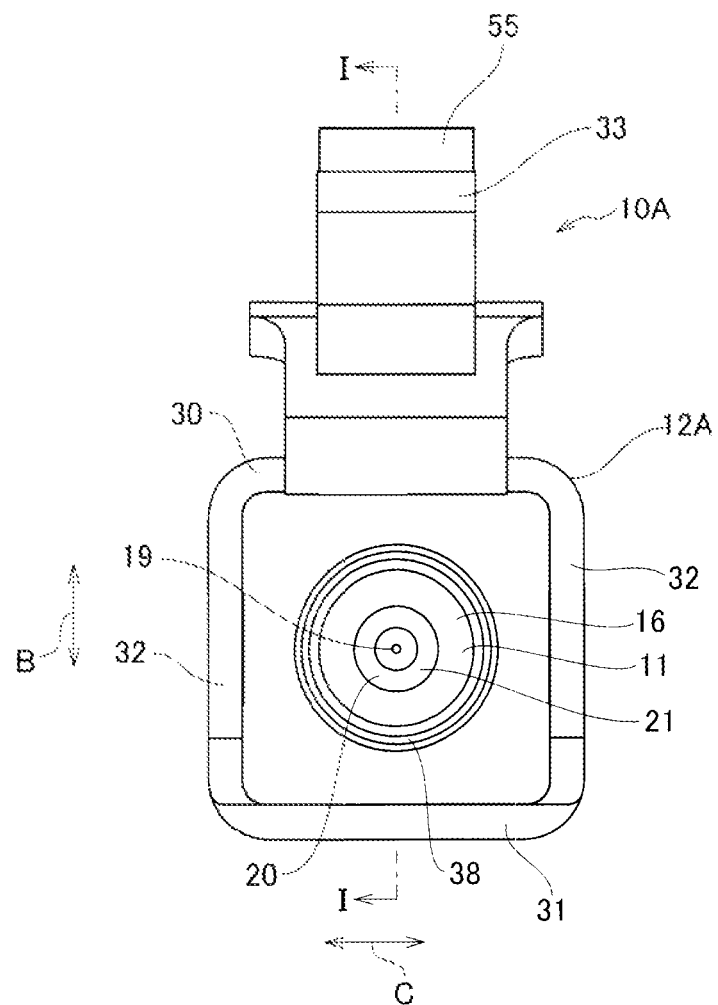
FIG. 2 is a front view of the optical connector plug in an assembled state.
Figure 3:
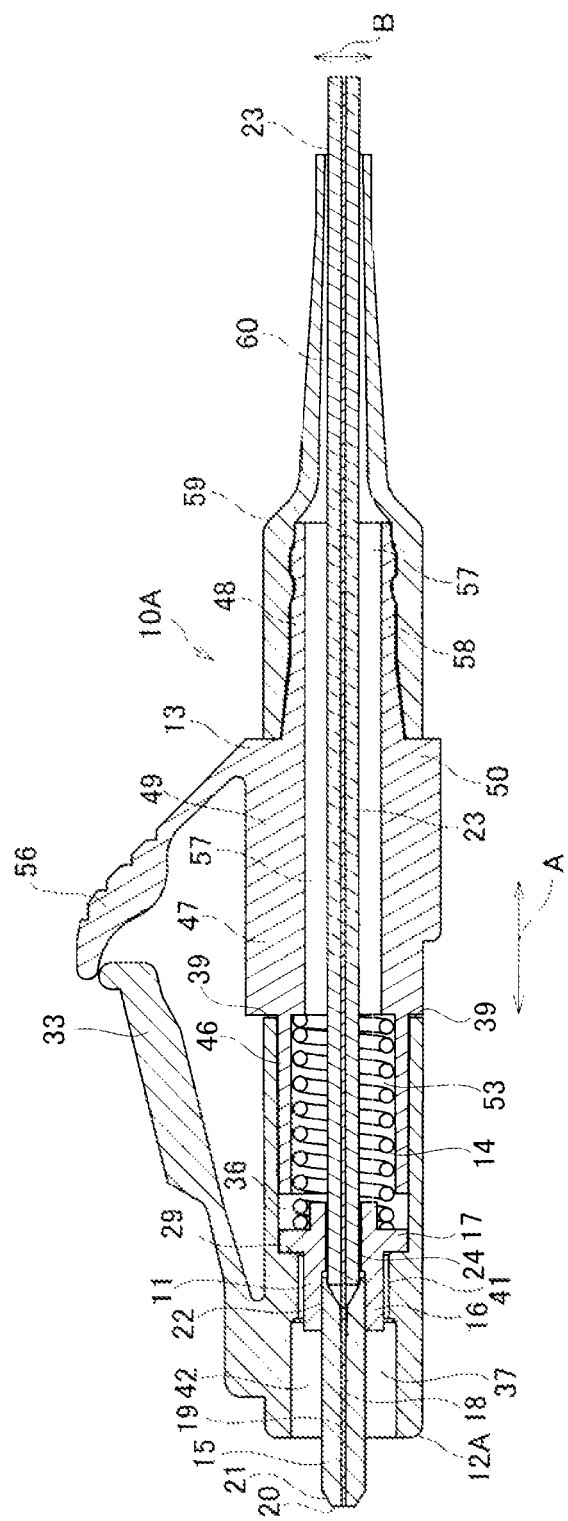
FIG. 3 is a section view along I-I line in FIG. 2.
Figure 4:
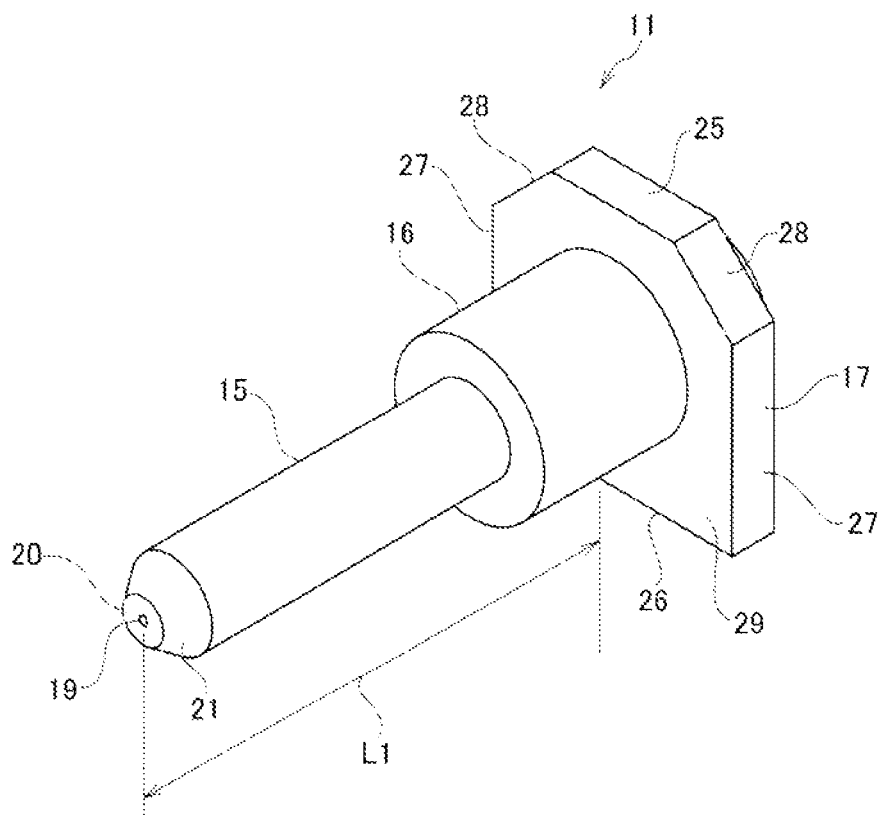
FIG. 4 is a perspective view of a ferrule.
Figure 5:
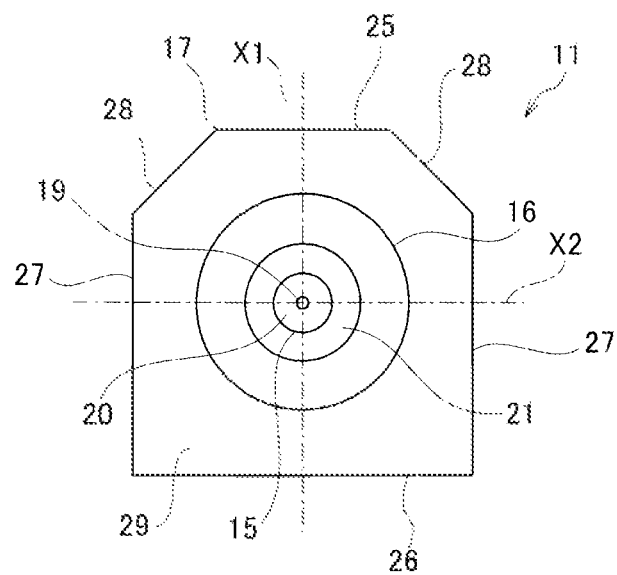
FIG. 5 is a front view of the ferrule.
Figure 6:
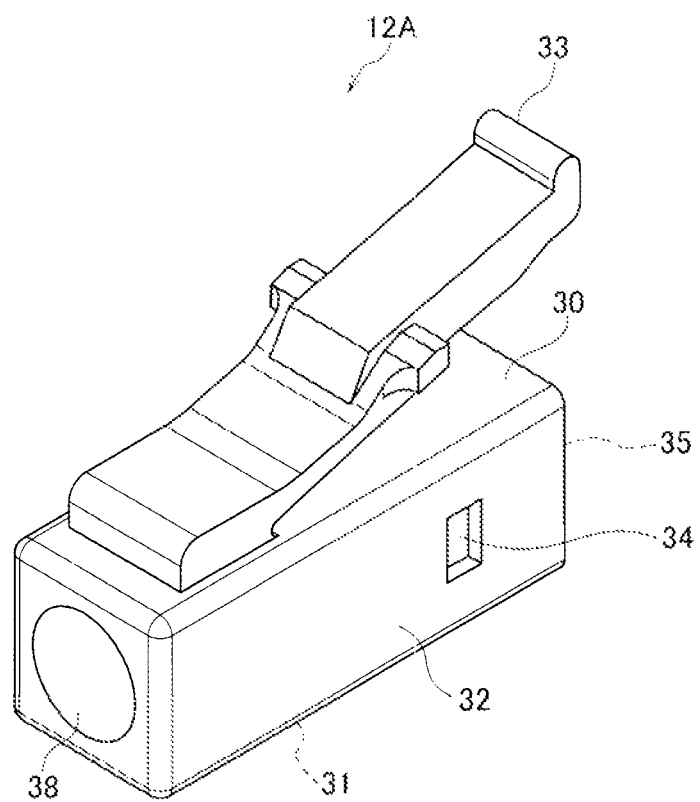
FIG. 6 is a perspective view of a plug frame.
Figure 7:
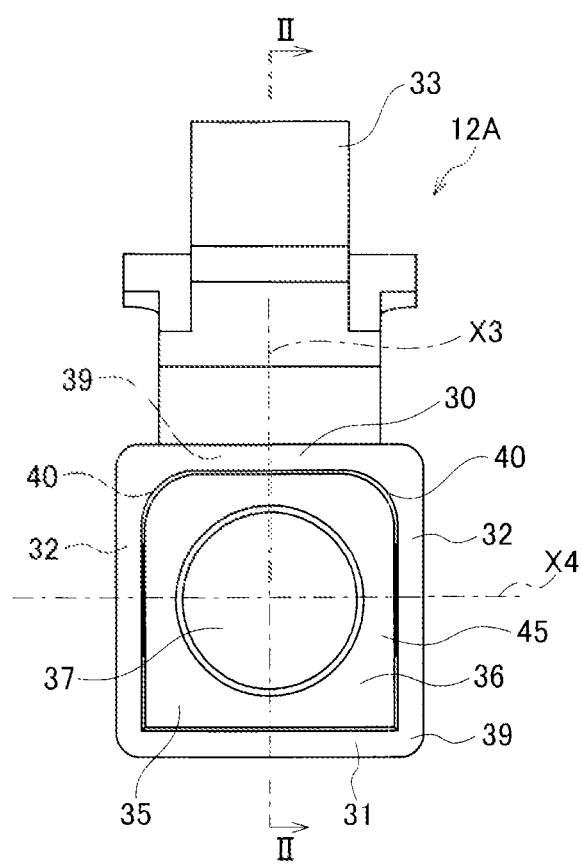
FIG. 7 is a rear view of the plug frame.
Figure 8:
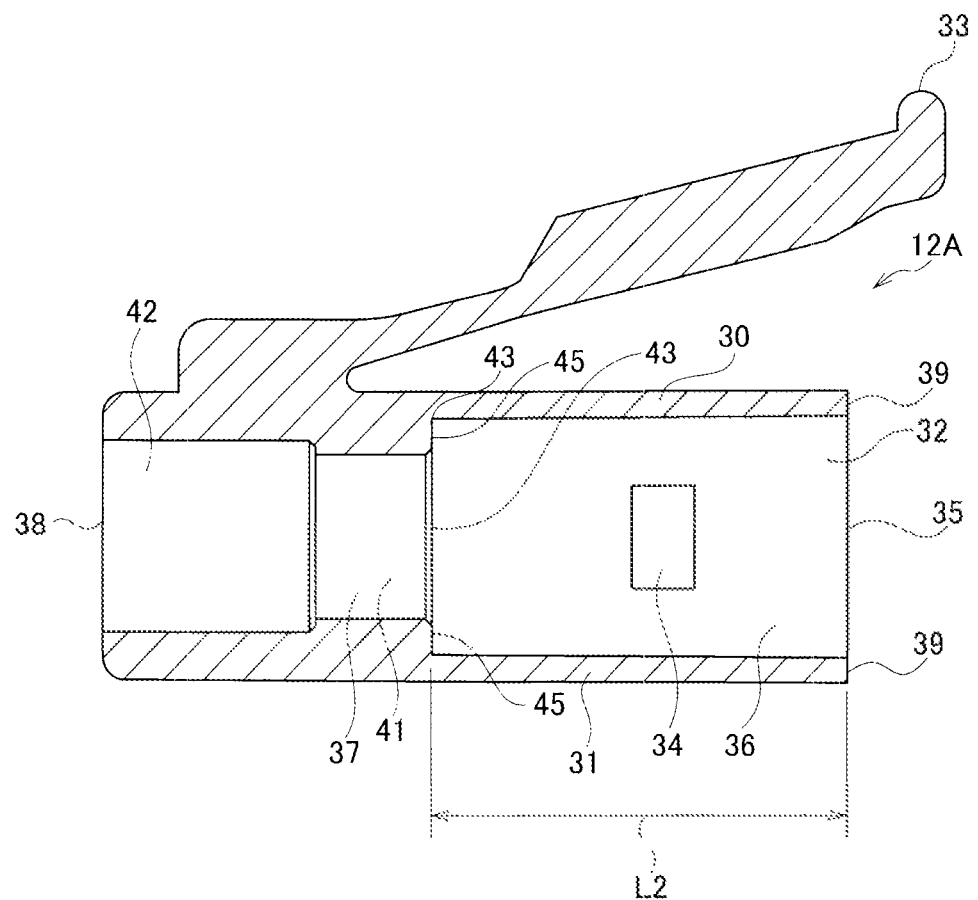
FIG. 8 is a section view along II-II line in FIG. 7.

The optical connector plug according to the present invention is described below in detail referring to the drawings attached such as FIG. 1 that is an exploded perspective view of an optical connector plug, and so on, shown as an example. Further, FIG. 2 is a front view of the optical connector plug in the assembled state, FIG. 3 is a section view along I-I line in FIG. 2. FIG. 4 is a perspective view of a ferrule 11, and FIG. 5 is a front view of the ferrule 11. FIG. 6 is a perspective view of a plug frame 12A, FIG. 7 is a rear view of the plug frame 12A. FIG. 8 is a section view along II-II line of FIG. 7. In FIGS. 1 to 3, the axial direction is shown by an arrow A (just in FIGS. 1 and 3), the vertical direction is indicated by an arrow B, the radial direction (lateral direction) is shown, by an arrow C (just in FIGS. 1 and 2).

The optical connector plug 10A is a connector plug that meets the size standard of the LC type optical connector (IEC 61754-20), and is used for the optical connection between optical fibers. The optical connector plug 10A is formed of a ferrule 11, a plug frame 12A, a stop ring 13, a spring 14 (coil spring), and a boot 59. The ferrule 11 includes a capillary 15 extending in the axial direction, a sleeve 16 located at a rearward portion of the capillary 15 in the axial direction, and a flange 17 located at a rearward portion of the sleeve 16 in the axial direction (at the rearward portion of the capillary 15 in the axial direction).

The capillary 15 is formed to have a substantially cylindrical shape which is long in the axial direction. In the capillary 15 (ferrule 11), an optical fiber insertion hole 18 extending in the axial direction is perforated, at least one optical fiber 19 is inserted and held in the optical fiber insertion hole 18. The capillary 15 includes an end face 20 at the distal end thereof in the axial direction from which the optical fiber 19 is exposed, and a chamfered portion 21 on an end surface outer diameter region of the end face 20. Further, the chamfered shape may be quadrilateral or rounded surface, however, it may be any shape. The end face 20 extends perpendicularly in the vertical direction. The chamfered portion 21 is inclined gradually toward outward in the radial direction from the end face 20 to the rearward portion in the axial direction.

The capillary 15 is made of a ceramic material such as zirconia, a plastic material, and a glass material such as a crystallized glass, borosilicate glass, and quartz. Further, the capillary 15 shown in FIG. 4 uses a zirconia capillary made of zirconia. The outer diameter of the capillary 15 is between 1.2485 mm and 1.2495 mm.

The sleeve 16 and the flange 17 are made of a metal material such as stainless steel, brass, steel, or a synthetic resin material, and they are formed integrally. The sleeve 16 and the flange 17 shown in FIG. 4 are made of brass. The sleeve 16 is formed to have a cylindrical shape which is long in the axial direction. In the sleeve 16, a capillary insertion hole 22 to insert and hold the capillary 15 and a core wire insertion hole 24 to insert and hold the buffered optical fiber 23 of the optical fiber 19 which is coated with a coating material on the outer peripheral thereof entirely are perforated.

In the capillary insertion hole 22 of the sleeve 16, the rear end portion of the capillary 15 is inserted, and the rear end of the capillary 15 is fixed and held in the capillary insertion hole 22 of the sleeve 16. One end portion of the buffered optical fiber 23 is inserted, into the core wire insertion hole 24 of the sleeve 16, and the one end portion of the buffered optical fiber 23 is fixed and held in the core wire insertion hole 24 of the sleeve 16. Further, the cross sectional shape of the sleeve 16 in the axial direction is not limited to the cylindrical shape shown in the FIG. 4, it may be a quadrilateral tube which is long in the axial direction.

The flange 17 extends outward in the axial direction from the outer periphery of the sleeve 16. The flange 17 includes an upper edge 25 and a lower edge 26 that are separated to face to each other in the vertical direction, and two side edges 27 that are separated to face to each, other in the lateral direction. As for the planar shape of the flange 17 (shape) in the axial direction, the flange 17 is formed to have a chamfered shape in which two upper corners 28 of a quadrilateral (polygonal) shape have been chamfered as shown in FIG. 5. Therefore, the flanges 17 is symmetrical with respect to a vertical center line X1 which divides the flanges 17 in the lateral direction, and is asymmetric with respect to the lateral center line X2 which divides the flanges 17 in the vertical direction. The length L1 from the end face 20 of the capillary 15 of the ferrule 11 to the front end surface 29 of the flange 17 in the axial direction is larger than 7 mm, and preferably between 7.0 and 7.3 mm.

Now the planar shape (shape) of the flange 17 in the axial direction is not limited to that shown in FIG. 5, however, any other shape can be adopted. However, as described later, if the rotation direction around the axis is limited to one direction so that the ferrule can enter the plug frame, it is necessary to be symmetrical, with respect to the vertical center line X1 and asymmetric with respect, to the lateral, center line X2, or asymmetric with respect to the vertical center line X1 and symmetric with respect to the lateral center line X2, or asymmetric with respect to the vertical center line X1 and asymmetric with respect to the lateral center line X2.

The plug frame 12A is made of a synthetic resin material, and is formed to be a hollow of substantially quadrilateral columnar shape. The plug frame 12A is formed of a top wall 30 and a bottom wall 31 that extend in the axial direction and are separated to face to each other in the vertical direction, and two side walls that extend in the axial direction and are separated to face to each other in the lateral direction. In the top wall 30 of the plug frame 12A, a disengagement knob 33 which can turn in the vertical direction is connected. In the two respective side walls 32 of the plug frame 12A, an engagement hole 34 piercing through the wall 32 is perforated.

The plug frame 12A includes an insertion port 35 located as the rear portion thereof in the axial direction to insert the ferrule 11, a first accommodation space 36 extending from the insertion port 35 forward in the axial direction, a second accommodation space 37 extending from the first accommodation space 36 forward in the axial direction, and a circular opening 38 located at the forward portion of the second accommodation space 37 in the axial direction.

The insertion port 35 is surrounded by the rear end surface 39 of the top wall 30 and the bottom wall 31 and the side walls 32 (rear end surface 39 of the plug frame 12A), is formed to have a substantially quadrilateral shape (polygon), and has a chamfered, shape in which the two upper corners 40 are chamfered. Further, the chamfered shape may be quadrilateral or rounded surface, however, it can be either one of them.

The first accommodation space 36 is surrounded by the top wall 30 and the bottom wall 31, and the two side walls 32, and extends in the axial direction. The first accommodation space 36 is formed to have substantially same shape and size as the cross-sectional shape and size of the insertion, port 35 in the axial direction, that is, it is substantially quadrilateral shape (polygon) and has chamfered shape in which two upper corners 40 are chamfered. The sizes of the insertion port 35 and the first accommodation space 36 are slightly larger than the size of the planar shape of the flange 17 in the axial direction so that the ferrule 11 including the flange 17 can enter into the first accommodation space 36 from the insertion port 35 and can move in the axial direction in the first accommodation space 36. In the first accommodation space 36, the flange 17 and the spring 14 of the ferrule 11 are to be accommodated.

The cross sectional shape of the first accommodation space 36 in the axial direction is symmetrical with respect to a vertical center line X3 which divides it in the lateral direction, and is asymmetric with respect to the lateral center line X4 which divides it in vertical direction. Further, the cross sectional shape of the first accommodation space 36 in the axial direction is not limited to that shown in the drawing, however, any other shape can be adopted. However, it is necessary to be substantially same shape with the planar shape of the flange 17 in the axial direction, and is symmetrical with respect to the vertical center line X3 and asymmetric with respect to the lateral center line X4, or asymmetric with respect to the vertical center line X3 and symmetric with respect to the lateral center line X4, or asymmetric with respect to the vertical center line X3 and asymmetric with respect to the lateral center line X4.

The second accommodation space 37 is surrounded by the top wall 30 and the bottom wall 31 and the two side walls 32, and extends from the front end 43 of the forward portion of the first accommodation space 36 to the trout end of the forward portion of the plug frame 12A (opening 38) in the axial direction. The second accommodation space 37 includes an engagement space 41 having a cross section of cylindrical shape in the axial direction, and an insertion space 42 located at the forward portion of the engagement space 41 in the axial direction and having a cross section of a cylindrical shape in the axial direction.

The size of the engagement space 41 of the second accommodation space 37 is small compared to those of the first accommodation space 36 and the insertion space 42. In the rearward portion of the second accommodation space 37 in the axial direction, a flange contact surface 45 which extends to inward in the radial direction from the front end 43 of the forward portion of the first accommodation space 36 in the axial direction (from the inner peripheral surface of the plug frame 12A) is formed.

The length L2 from the front end 43 of the forward portion of the first accommodation space 36 of the plug frame 12A to the rear end surface 39 of the rearward portion of the plug frame 12A in the axial direction (insertion port 35) is smaller than 7 mm, and preferably between 6.5 and 6.8 mm. The length L2 is smaller (short) than the length L1 from the end face 20 of the capillary 15 of the ferrule 11 to the front end 29 the flange 17 in the axial direction. In other words, the length L1 from the distal end 20 of the capillary 15 of the ferrule 11 to the front end surface 29 of the flange 17 in the axial direction is larger than (long) the length L2 from the front end 43 of the forward portion of the first accommodation space 36 of the plug frame 12A to the rear end surface 39 (insertion port 35) of the rearward portion of the plug frame 12A in the axial direction, that is, L1>L2.

The size of the engagement space 41 of the second accommodation space 37 is slightly larger than the size of the cross sectional shape of the sleeve 16 in the axial direction. In the engagement space 41 of the second accommodation space 37, the sleeve 16 of the ferrule 11 is inserted and held. In the insertion space 42 of the second accommodation space 37, the capillary 15 of the ferrule 11 is positioned, and the end face 20 of the capillary 15 is exposed to the front area of the second accommodation space 37 from the insertion space 42. The cross sectional shape of the engagement space 41 of the second accommodation space 37 and the cross sectional shape of the insertion space 42 in the axial direction are not limited to cylindrical shape, it may be a quadrilateral shape which is long in the axial direction.

The stop ring 13 is made of a metal material or a synthetic resin material, and is formed to have a substantially quadrilateral columnar hollow extending in the axial direction. The stop ring 13 includes an insertion tube portion 46 to be inserted into the first accommodation space 36 of the plug frame 12A, an exposed cylindrical portion 47 provided at the rearward portion of the insertion tube portion 46 in the axial direction, and an engagement cylindrical portion 48 provided at the rearward portion of the exposed cylindrical portion 47 in the axial direction. The insertion tube portion 46, the exposed cylindrical portion 47 and the engagement cylindrical portion 48 are formed integrally, and arranged in a series in the axial direction.

The insertion tube portion 46 is formed of a top wall 49 and a bottom wall 50 that extend in the axial direction and are separated vertically to face to each other, and two side walls 51 that extend in the axial direction and are separated laterally to face to each other. In the insertion tube portion 46, the cross sectional shape thereof in the axial direction is formed to have substantially same shape as that of the first accommodation space 36, that is, it is substantially quadrilateral, and each corner portion 52 is chamfered. The insertion tube portion 46 has a sufficient size to be inserted slidably into the first accommodation space 36.

In the insertion tube portion 46, an accommodation space 53 which is surrounded by the top wall 49 and the bottom wall 50 and the two side walls 51 is formed. In the accommodation space 53, the spring 14 and the buffered optical fiber 23 extending from the core wire insertion hole 24 of the sleeve 16 are to be accommodated. In the side walls 51 which form the insertion tube portion 46, an engagement convex portion 54 which is protruding in the lateral direction is formed.

The exposed cylindrical portion 47 is formed of the top wall 49 and the bottom wall 50 that extend in the axial direction and are separated vertically to face to each other, and two side walls 51 that extend in the axial direction and are separated laterally to face to each other. In the exposed cylindrical portion 47, the cross sectional shape thereof in the axial direction is formed to have substantially quadrilateral shape, and each corner portion 52 is chamfered to have chamfered portion 55. In the top wall 49 which forms the exposed cylindrical portion 47, a disengagement knob 56 which can be turned in the vertical direction is connected. In the exposed cylindrical portion 47, an insertion space 57 which is surrounded by the top wall 49, the bottom wall 50 and the two side walls 51 is formed. The buffered optical fiber 23 is inserted into the insertion space 57.

The engagement cylinder portion 48 is formed to have a tapered cylindrical shape tapered toward the rearward portion in the axial direction. In the engagement cylinder portion 48, an insertion space 57 which is surrounded by a peripheral wall 58 is formed. The buffered optical fiber 23 is inserted in the insertion space 57. A boot 59 is fitted to the engagement cylindrical portion 48. The boot 59 is made of elastic material such as rubber and elastomer, or, a synthetic resin material. An insertion space 60 is formed in the boot 59, the buffered optical fiber 23 is inserted into the insertion space 60.

Figure 9:
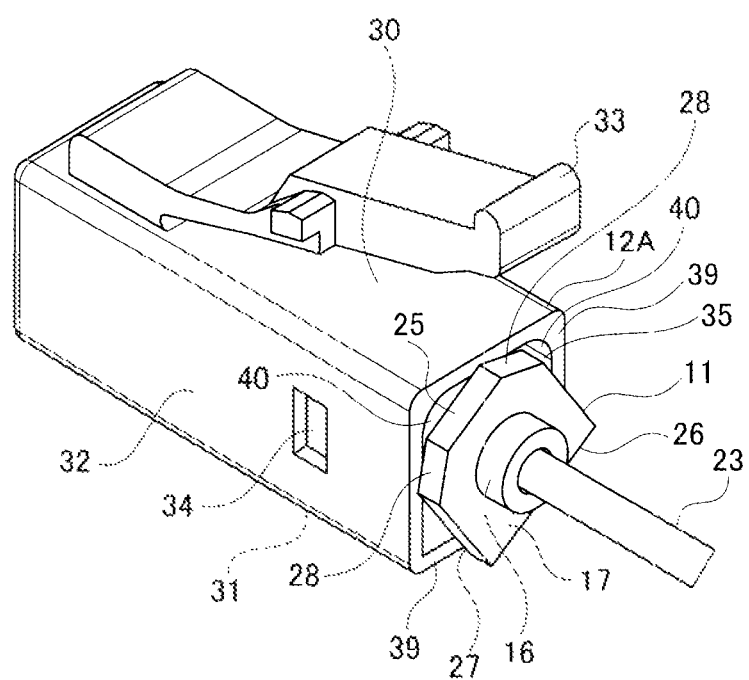
FIG. 9 is a perspective view showing an example of the ferrule and the plug frame in the assembly process of the optical connector plug.
Figure 10:
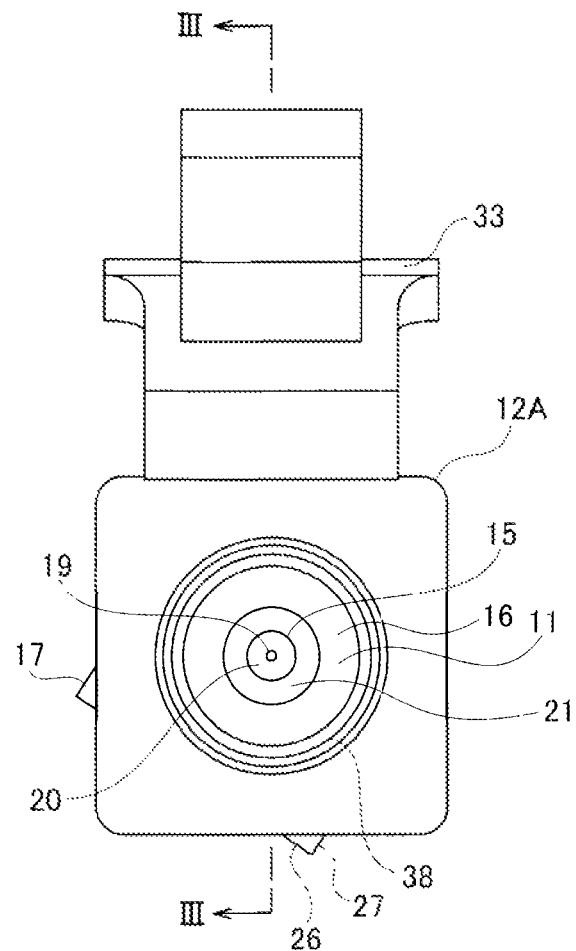
FIG. 10 is a front view of FIG. 9.
Figure 11:
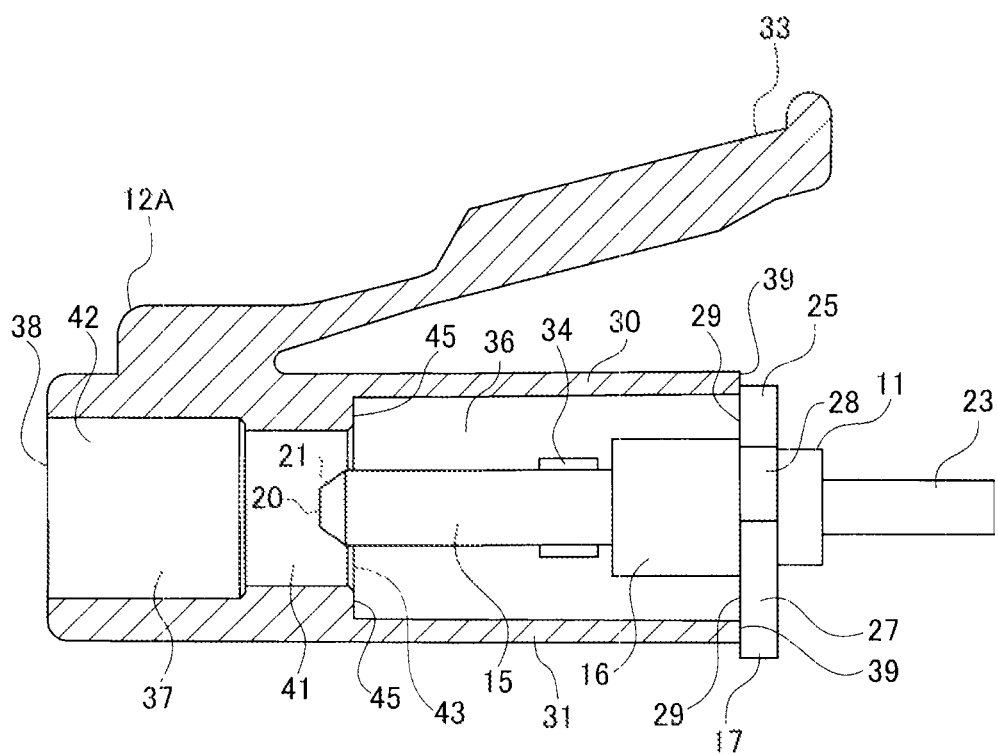
FIG. 11 is a section view along III-III line in FIG. 10.
Figure 12:
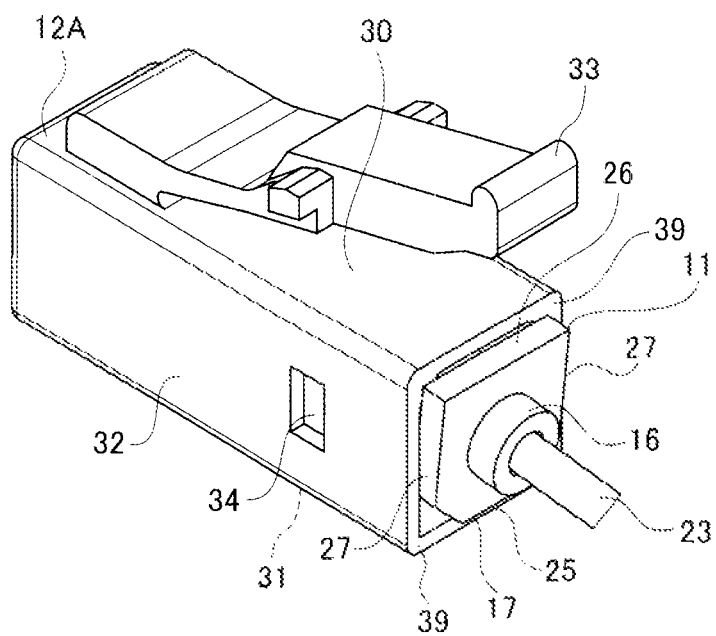
FIG. 12 is a perspective view showing another example of the ferrule and the plug frame in the assembly process of the optical connector plug.
Figure 13:
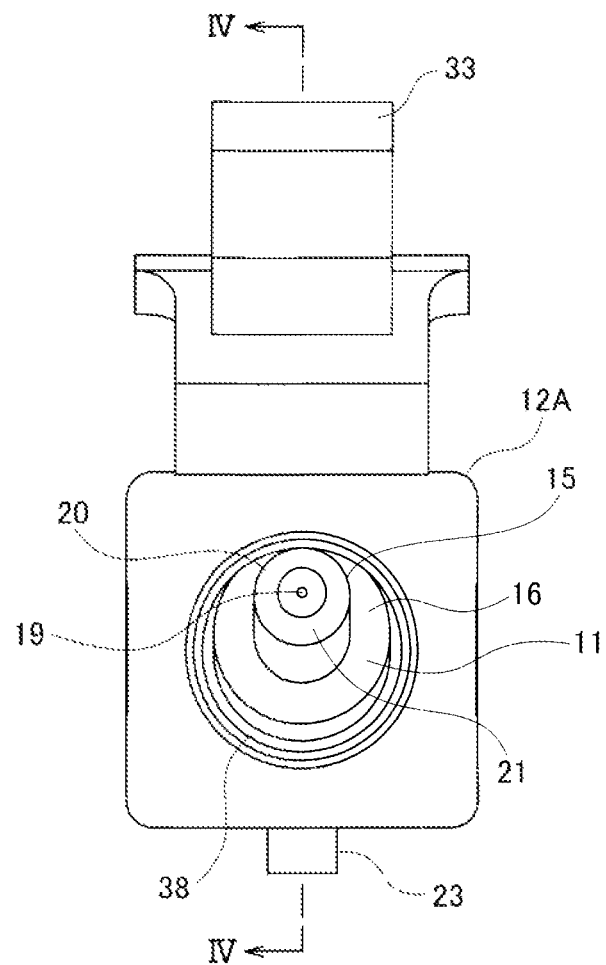
FIG. 13 is a front view of FIG. 12.
Figure 14:
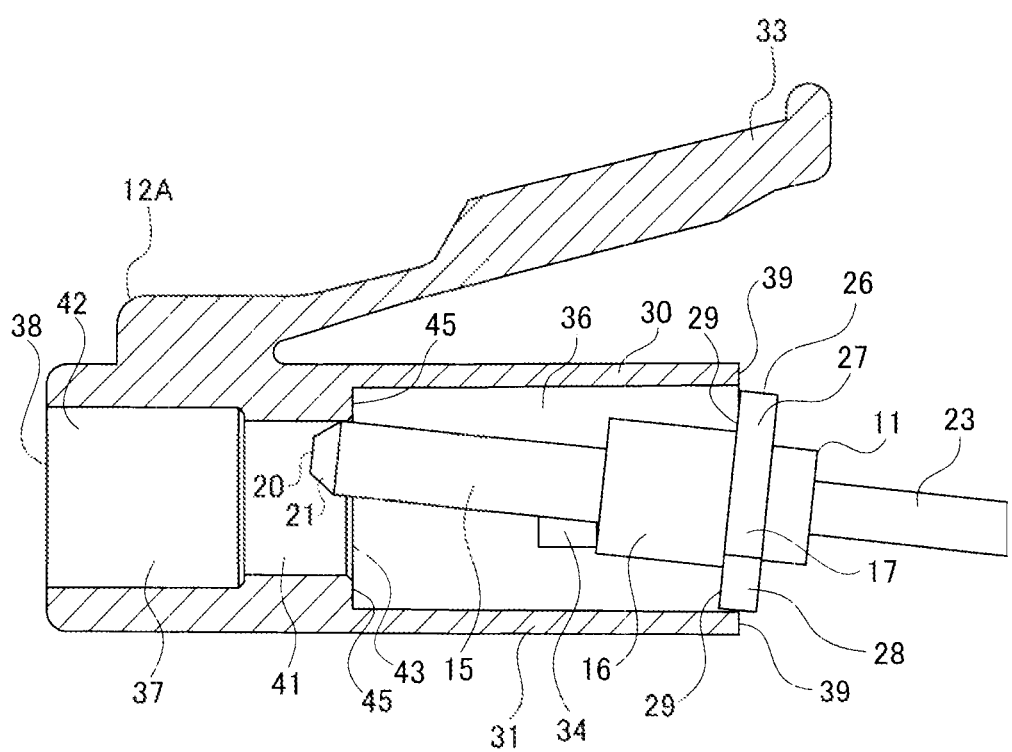
FIG. 14 is a section view along IV-IV line in FIG. 13.

FIG. 9 is a perspective view showing an example of the ferrule 11 and the plug frame 12A in the assembly process of the optical connector plug 10A, FIG. 10 is a front view of FIG. 9, FIG. 11 is a section view along III-III line in FIG. 10, FIG. 12 is a perspective view showing another example of the ferrule 11 and the plug frame 12A in the assembly process of the optical connector plug 10A, FIG. 13 is a front view of FIG. 12. FIG. 14 is a section view along IV-IV line in FIG. 13. Based on the respective figures, the assembling procedure of the optical connector plug 10A is described below.

As for the assembling procedure of the optical connector plug 10A, first the ferrule 11 is accommodated in the plug frame 12A. Now, the buffered optical fiber 23 is extending from the sleeve 16 of the ferrule 11. In order to accommodate the ferrule 11 in the plug frame 12A, while the buffered optical fiber 23 extending from the sleeve 16 is held by fingers, the capillary 15 of the ferrule 13 is inserted from the insertion port 35 of the plug frame 12A to the first accommodation space 36.

At a time when the ferrule 11 is inserted in the plug frame 12A, the flange 17 can be fitted (set in) to the first accommodation space 36 when the shape of the flange 17 matches with the cross sectional shape of the first accommodation space 36 of the plug frame 12A in the axial direction, and the flange 17 is opposed to the first accommodation space 36 so as to be entered therein.

In a state in which the capillary 15 inserted from the insertion port 35 of the plug frame 12A is moved forward in the axial direction, the capillary 15 is accommodated in the first accommodation space 36 and the flange 17 of the ferrule 11 is not accommodated in the first accommodation space 36, the ferrule 11 can be rotated about the axis.

At the time of the assembly of the optical connector plug 10A, in a state in which the front end surface 29 of the flange 17 is in contact with the rear end surface 39 of the plug frame 12A which extends to the insertion port 35, while rotating the ferrule 11 about the axis, it is set that the shape of the flange 17 of the ferrule 11 is matched with the cross sectional shape of the first accommodation space 36 in the axial direction, and the flange 17 is opposed to the first accommodation space 36 so as to be entered therein.

As shown in FIGS. 9 and 10, in a state in which the flange 17 of the ferrule 11 is slightly rotated in the counter-clockwise direction, the cross sectional shape of the first accommodation space 36 does not match with the shape of the flange 17 of the ferrule 11 in the axial direction, and the flange 17 is not opposed to the first accommodation space 36 so as to be entered therein, accordingly, it is not possible to fit (set in) the flange 17 to the first accommodation space 36. In the state of FIGS. 9 and 10, the front end surface 29 of the flange 17 is in contact with the rear end surface 39 of the plug frame 12A in a flat condition (the rear end surface 39 is parallel to the front end surface 29), as shown in FIG. 11, the capillary 15 of the ferrule 11 (including the sleeve 16) is extending straightly in the axial direction.

As for the ferrule 11, the length L1 from the end face 20 of the capillary 15 to the front end surface 29 of the flange 17 in the axial direction is larger than the length L2 from the front end 43 of the forward portion of the first accommodation space 36 of the plug frame 12A to the rear end surface 39 of the plug frame 12A in the axial direction which extends to the insertion port 35, accordingly, in a state in which the front end surface 29 of the flange 17 is in contact with the rear end surface 39 of the plug frame 12A in a flat condition, the end face 20 and the chamfered portion 21 of the capillary 15 are located in the second accommodation space 37 (the second accommodation space 37 which is extending just in front of the flange contact surface 45).

Further, in a state in which the front end surface 29 of the flange 17 is in contact with the rear end surface 39 of the plug frame 12A in a flat condition, the length L1 from the end face 20 of the capillary 15 to the front end surface 29 of the flange 17 in the axial direction may be adjusted with respect to the length L2 from the front end 43 of the forward portion of the first accommodation space 36 of the plug frame 12A to the rear end surface 39 of the plug frame 12A in the axial direction so that only the end face 20 of the capillary 15 is located in the second accommodation space 37.

In a state shown in FIGS. 12 to 14 in which the flange 17 of the ferrule 11 is rotated further in the counter-clockwise direction from the state of FIGS. 9 to 11, the upper edge 25 of the flange 17 is positioned on the side of the bottom wall 31 of the plug frame 12A, the lower edge 26 of the flange 17 is positioned on the side of the top wall 30 of the plug frame 12A, the cross sectional shape of the first accommodation space 36 does not match with the shape of the flange 17 of the ferrule 11 in the axial direction, and the flange 17 is not opposed to the first accommodation space 36 so as to be entered therein, accordingly, it is not possible to fit (set in) the flange 17 to the first accommodation space 36.

When the upper edge 25 of the flange 17 enters in the first accommodation space 36 of the plug frame 12A slightly, and the front end face 29 of the flange 17 is in contact with the rear end surface 39 of the plug frame 12A while the front end face 29 is tilted (the rear end surface 39 is in contact with the front end surface 29 in a non-parallel condition), as shown in FIG. 14, the capillary 15 of the ferrule 11 (including the sleeve 16) is inclined in an upward slope (turning in the radial direction) from the first accommodation space 36 towards the second accommodation space 37.

Since the length L1 of the ferrule 11 is larger than the length L2 of the first accommodation space 36 of the plug frame 12A, even if the capillary 15 is inclined in the upward slope, the end face 20 of the capillary 15 is in contact with the inner peripheral surface of the second accommodation space 37, and the end face 20 of the capillary 15 does not come in contact with the front end 43 of the forward portion of the first accommodation space 36 of the plug frame 12A (flange contact surface 45) in the axial direction.

Figure 15:
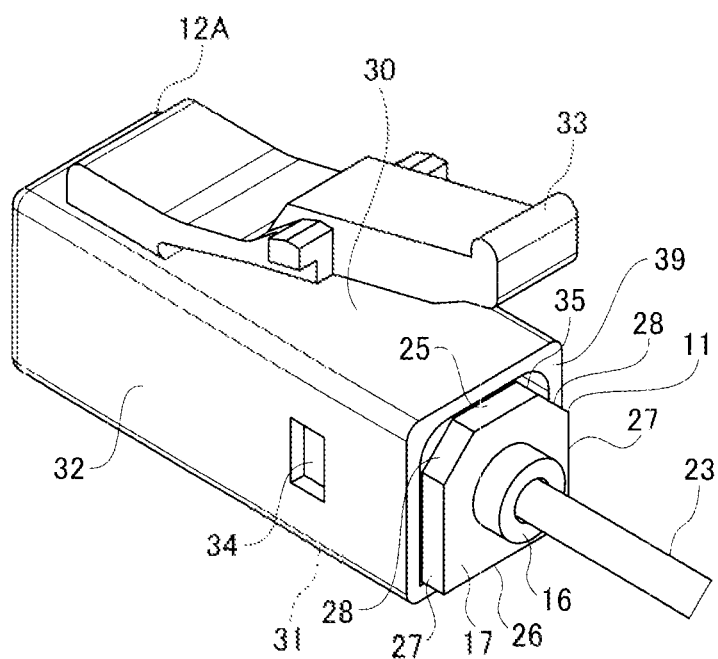
FIG. 15 is a perspective view showing another example of the ferrule and the plug frame in the assembly process of the optical connector plug.
Figure 16:
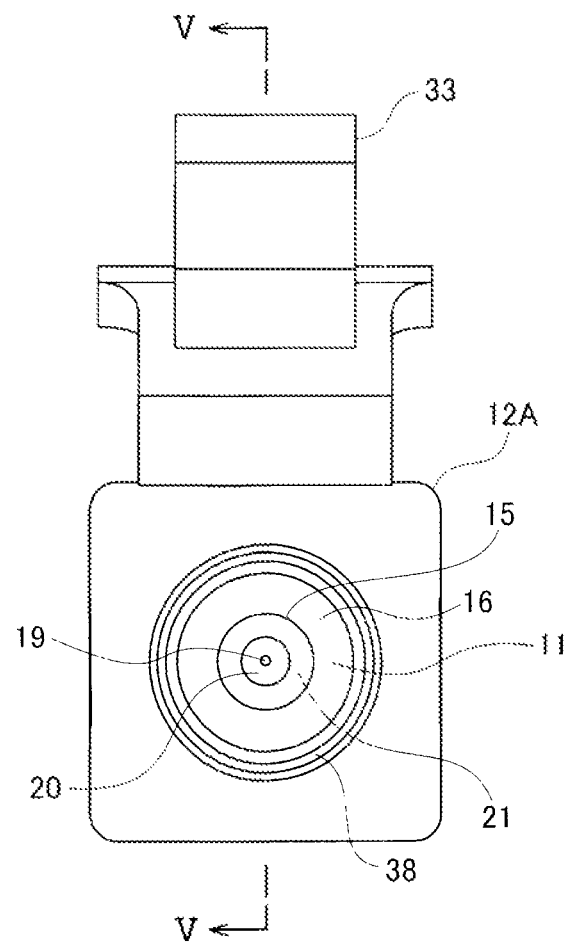
FIG. 16 is a front view of FIG. 15.
Figure 17:
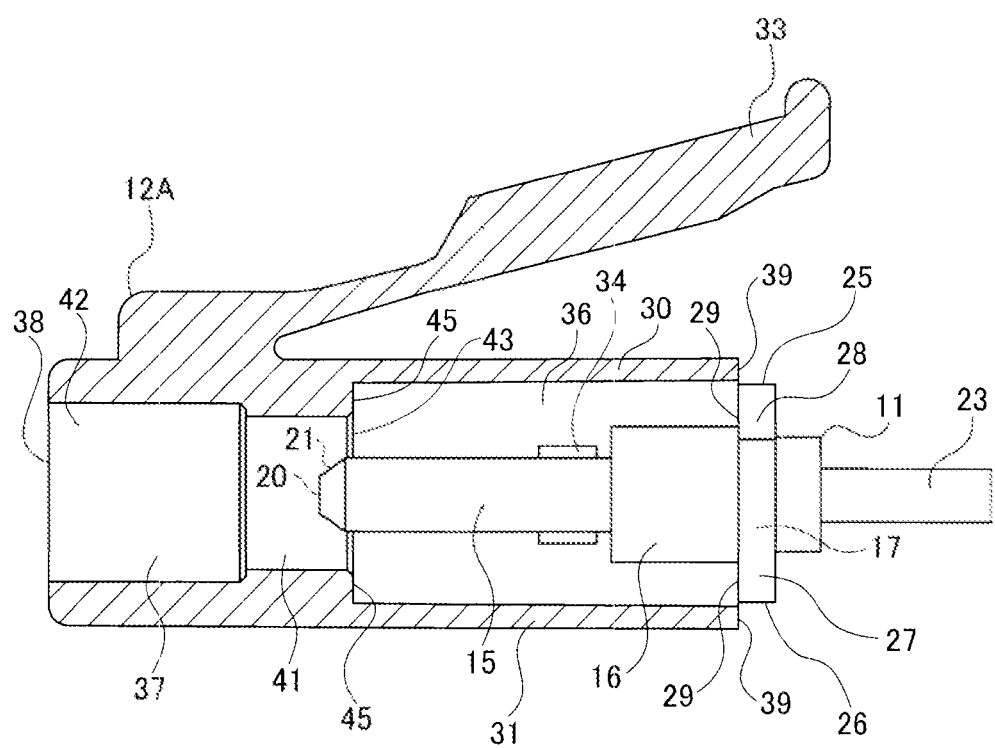
FIG. 17 is a section view along V-V line in FIG. 16.
Figure 18:
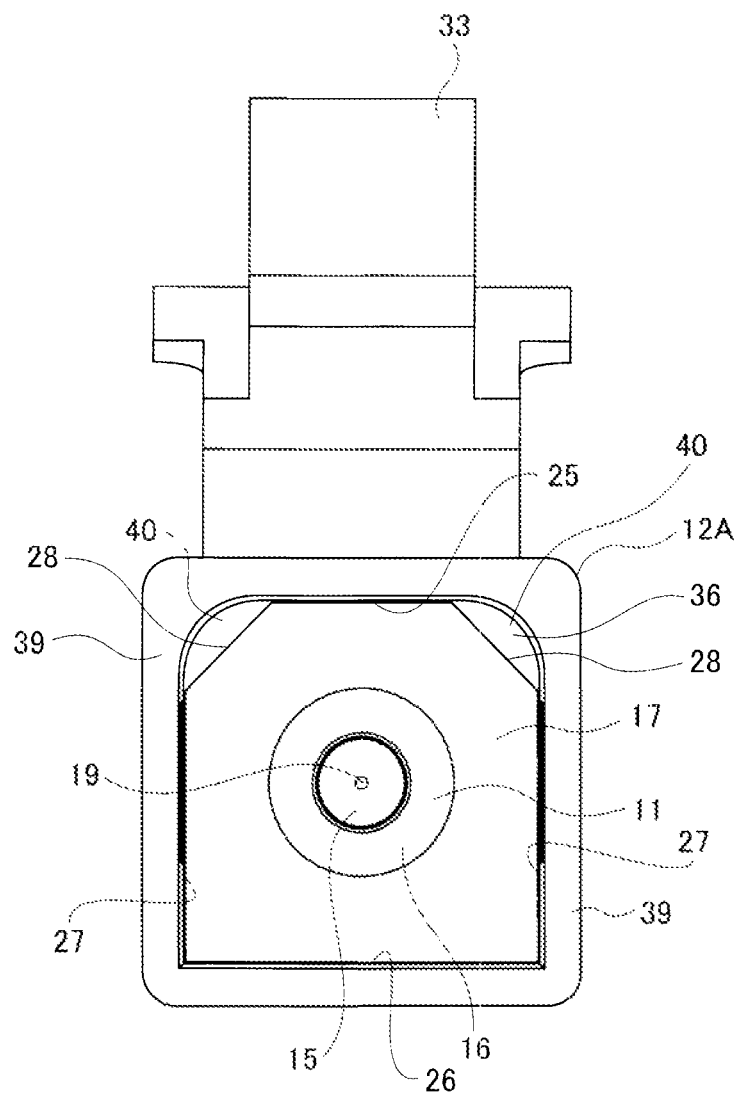
FIG. 18 is a rear view of the plug frame showing a state in which the ferrule has entered in the plug frame.

FIG. 15 is a perspective view showing another example of the ferrule 11 and the plug frame 12A in the assembly process of the optical connector plug 10A, FIG. 16 is a front view of FIG. 15, FIG. 17 is a section view along V-V line in FIG. 16, FIG. 18 is a rear view showing a state in which the ferrule 11 has entered in the plug frame 12A.

When the flange 17 of the ferrule 11 is rotated in the counter-clockwise direction from the state of FIGS. 12 to 14, the upper edge 25 of the flange 17 is positioned on the side of the top wall 30 of the plug frame 12A, the lower edge 26 of the flange 17 is positioned on the side of the bottom wall 31 of the plug frame 12A, and the two side edges 27 of the flange 17 are positioned on the sides of the side wall 32 of the plug frame 12A, respectively. In the state of FIGS. 15 to 17, since the shape of the flange 17 matches with the cross-sectional shape of the first accommodation space 36 to face in the axial direction and the flange 17 is opposed to the first accommodation space 36 in a condition in which the flange 17 can enter the first accommodation space 36, accordingly, it is possible that the flange 17 can be fitted (set in) to the first accommodation space 36.

Further, in the state in which the positional relationship about the axis between the ferrule 11 and the plug frame 12A that face to each other is that shown in FIGS. 13 to 17, and in the state in which the front end surface 29 of the flange 17 is in contact with the rear end surface 39 of the plug frame 12A in a flat condition, similarly to FIG. 11, the capillary 15 is extending straightly in the axial direction, and the end face 20 of the capillary 15 is located in the second accommodation space 37.

In the state in which the upper edge 25 of the flange 17 of the ferrule 11 is positioned on the side of the top wall 30 of the plug frame 12A, the lower edge 26 of the flange 17 is positioned on the side of the bottom wall 31 of the plug frame 12A, and the side edges 27 of the flange 17 are positioned on the sides of the side walls 32 of the plug frame 12A, respectively, when the ferrule 11 is moved forward in the axial direction, the flange 17 is fitted (enters) to the first accommodation space 36 from the insertion port 35.

The planar shape of the flange 17 in the axial direction is asymmetric with respect to the lateral center line X2, the cross sectional shape of the first accommodation space 36 in the axial direction is asymmetric with respect to the lateral center line X4, accordingly, when the flange 17 is fitted to the first accommodation space 36, the rotation around the axis of the ferrule 11 is prevented by the top wall 30 and the bottom wall 31 and the two side walls 32 of the plug frame 12A which extend in a first accommodation space 36, so that the ferrule 11 (flange 17) cannot be rotated in the first accommodation space 36.

Further, a gap (clearance) is formed between the inner peripheral surface of the first accommodation space 36 of the plug frame 12A and the outer peripheral edge of the flange 17 of the ferrule 11 fitted to the first accommodation space 36. Since the gap (clearance) is formed between the first accommodation space 36 and the flange 17 in the optical connector plug 10A, the flange 17 of polygon can be inserted smoothly to the first accommodation space 36 of polygon, when the ferrule 11 is inserted into the plug frame 12A, further, after insertion of the ferrule 11 into the plug frame 12A, the flange 17 can be moved (forward and backward) smoothly in the axial direction in the first accommodation space 36.

When the ferrule 11 is moved forward in axial direction after the flange 17 is inserted into the first accommodation space 36, the capillary 15 of the ferrule 11 passes through the engagement space 41 of the second accommodation space 37, and enters in the insertion space 42, and the sleeve 16 of the ferrule 11 enters in the engagement space 41 of the second accommodation space 37. When the sleeve 16 enters in the engagement space 41, the front end surface 29 of the flange 17 is in contact with the front end 43 of the forward portion of the first accommodation space 36 (flange contact surface 45) in the axial direction, so that further forward movement of the ferrule 11 in the axial direction is stopped.

When the ferrule 11 is inserted into the plug frame 12A, and the front end surface 29 of the flange 17 is in contact with the flange contact surface 45, the end face 20 of the capillary 15 is exposed forward in the axial direction from the opening 38 as shown in FIG. 3, the main body of the capillary 15 is located in the insertion space 42, and the sleeve 16 is located in the engagement space 41.

Alter the ferrule 11 is inserted into the plug frame 12A, the spring 14 is inserted from the insertion port 35 of the plug frame 12A to the buffered optical fiber 23 extending rearward in the axial direction, the buffered optical fiber 23 is inserted into the accommodation space 53 of the insertion tube portion 46 of the stop ring 13 and the insertion space 57 of the engagement cylindrical portion 48 and the exposed cylindrical portion 47, and the buffered optical fiber 23 is inserted into the insertion space 60 of the boot 59. Next, the insertion tube portion 46 of the stop ring 13 is pressed and inserted into the first accommodation space 36 from the insertion port 35 of the plug frame 12A.

When the insertion tube portion 46 is pressed and inserted into the first accommodation space 36, and the insertion tube portion 46 is moved forward in the axial direction, the spring 14 is accommodated in the accommodation space 53 of the insertion tube portion 46, and the rear end of the spring 14 is in contact with the exposed tube section 47, so that the spring 14 is pushed forward in the axial direction. When the rear end surface 39 of the plug frame 12A is in contact with the exposed cylindrical portion 47, the engagement protrusion 54 of the insertion tube portion 46 is fitted to the engagement hole 34 of the plug frame 12A, and the insertion tube portion 46 of the stop ring 13 is fitted to the first accommodation space 36 of the plug frame 12A, thereby, the assembly of the optical connector plug 10A is completed. Further, the disengagement knob 56 of the stop ring 13 rides on the disengagement knob 33 of the plug frame 12A.

In the optical connector plug 10A, the length L1 from the end face 20 of the capillary 15 of the ferrule 11 to the front end surface 29 of the flange 17 in the axial direction is larger than the length L2 from the front end 43 of the forward portion of the first accommodation space 36 of the plug frame 12A (flange contact surface 45) to the rear end surface 39 of the rearward portion of the plug frame 12A in the axial direction, in a state in which the front end surface 29 of the flange 17 is in contact with the rear end surface 39 of the plug frame 12A which extends to the insertion port 35, the end face 20 and the chamfered portion 21 of the capillary 15 are located in the second accommodation space 37, accordingly, when the ferrule 11 is inserted into the plug frame 12A, the end face 20 and the chamfered portion 21 of the capillary 15 do not come in contact with the front end 43 of the forward portion of the first, accommodation space 36 (flange contact surface 45) in the axial direction, and it is possible to insert the ferrule 11 to the plug frame 12A smoothly, therefore, the flange 17 of the ferrule 11 can be easily accommodated in the first accommodation space 36 and the capillary 15 of the ferrule 11 can be easily accommodated in the second accommodation space 37.

In the optical connector plug 10A, since the ferrule 11 can be inserted into the plug frame 12A smoothly, it is possible to assemble the optical connector plug 10A formed of the ferrule 11, the plug frame 12A, the stop ring 13, and the spring 14 in a short time without requiring effort in the construction field of the optical fiber 19, consequently, it is possible to perform the optical connection work of the optical fiber 19 efficiently.

In the optical connector plug 10A, when the capillary 15 is turned in the radial direction (inclined) in a state in which the front end surface 29 of the flange 17 is in contact with the rear end surface 39 of the plug frame 12A which extends to the insertion port 35, the main body of the capillary 15 is in contact with the inner peripheral surface of the second accommodation space 37, and the end face 20 and the chamfered portion 21 of the capillary 15 cannot be in contact with the flange contact surface 45 and the inner peripheral surface of the plug frame 12A directly, therefore, it is possible to prevent the end surface of the optical fiber 19 and the end face 20 and the chamfered portion 21 of the capillary 15 from scratching.

In the optical connector plug 10A, when the planar shape of the flange 17 in the axial direction matches with the cross sectional shape of the first accommodation space 36 in the axial direction to face to each other and the flange 17 is opposed to the first accommodation space 36 so as to be entered therein when the ferrule 11 is inserted into the plug frame 12A, the flange 17 is fitted to the first accommodation space 36 in a condition in which the flange 17 can be moved in the axial direction and cannot be rotated around the axis, accordingly, the position around the axis of the ferrule 11 is inevitably determined with respect to the plug frame 12A by inserting the flange 17 of the ferrule 11 in the first accommodation space 36, accordingly, it is possible to easily perform the positioning around the axis of the ferrule 11 with respect to the plug frame 12A, consequently, the optical connector plug 10A can be assembled in a short time without requiring effort.

In the optical connector plug 10A, since when the flange 17 is fitted to the first accommodation space 36, the rotation of the flange 17 around the axis becomes disabled, while preventing positional displacement of the ferrule 17 around the axis with respect to the plug frame 12A, it is possible to insert the ferrule 11 into the plug frame 12A in a state in which the position of the ferrule 11 around the axis is matched with respect to the plug frame 12A.

Figure 19:
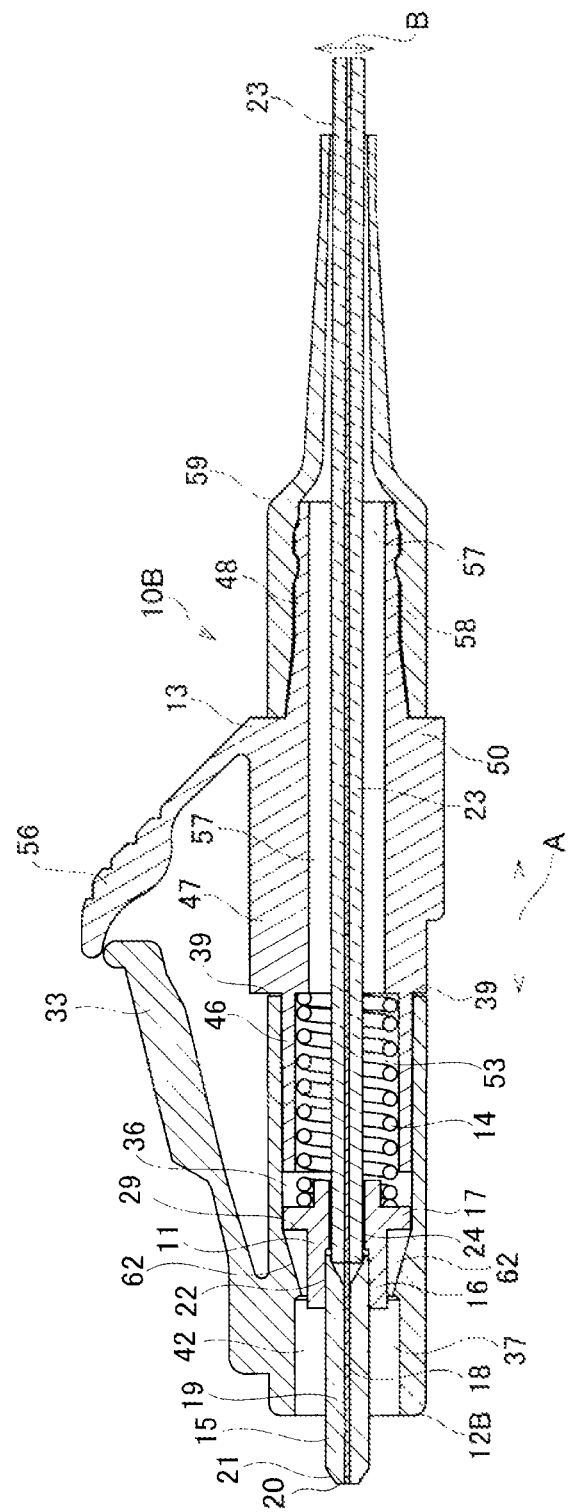
FIG. 19 is a section view similar to FIG. 3 showing another example of the optical connector plug.
Figure 20:
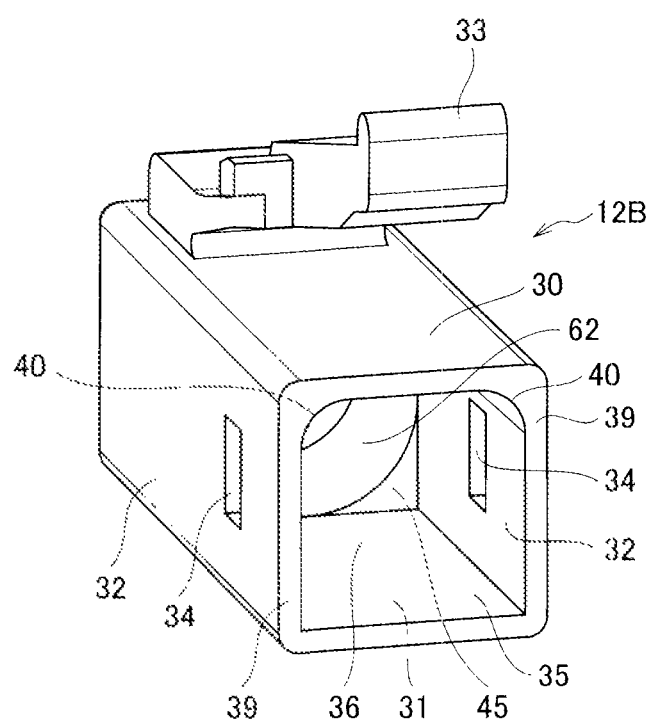
FIG. 20 is a rear perspective view of a plug frame showing as another example.
Figure 21:
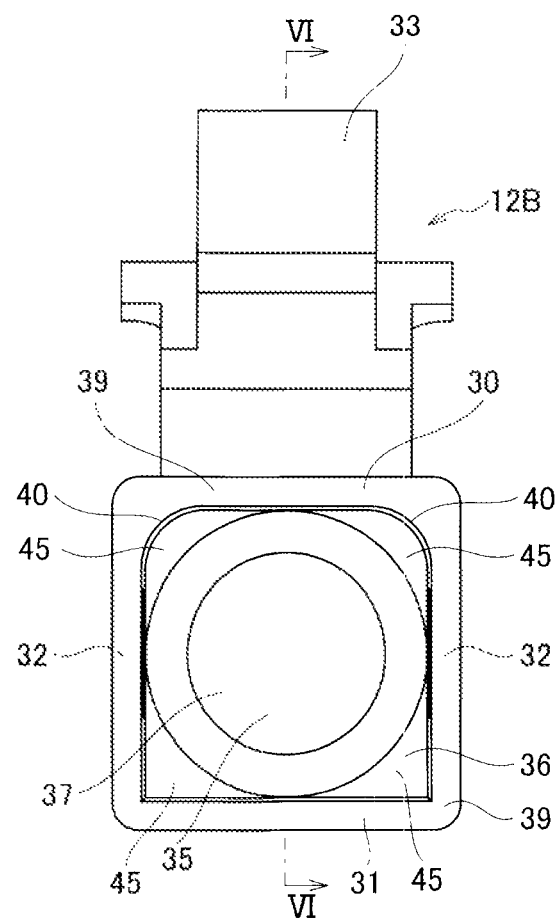
FIG. 21 is a rear view of a plug frame.
Figure 22:
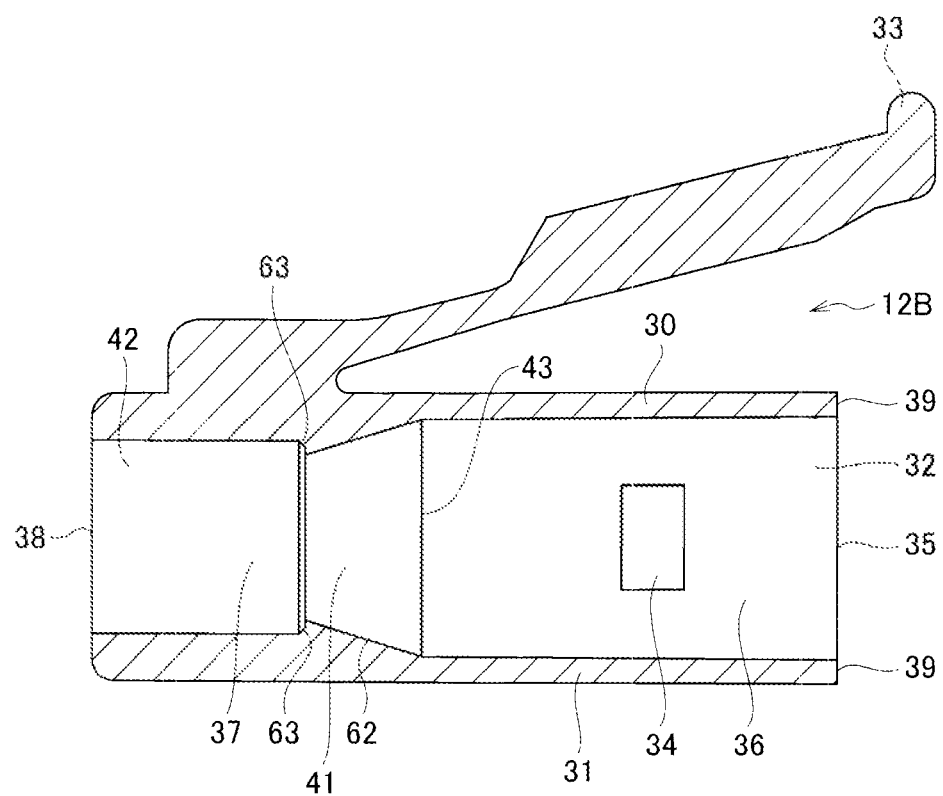
FIG. 22 is a section view along VI-VI line in FIG. 21.
Figure 23:
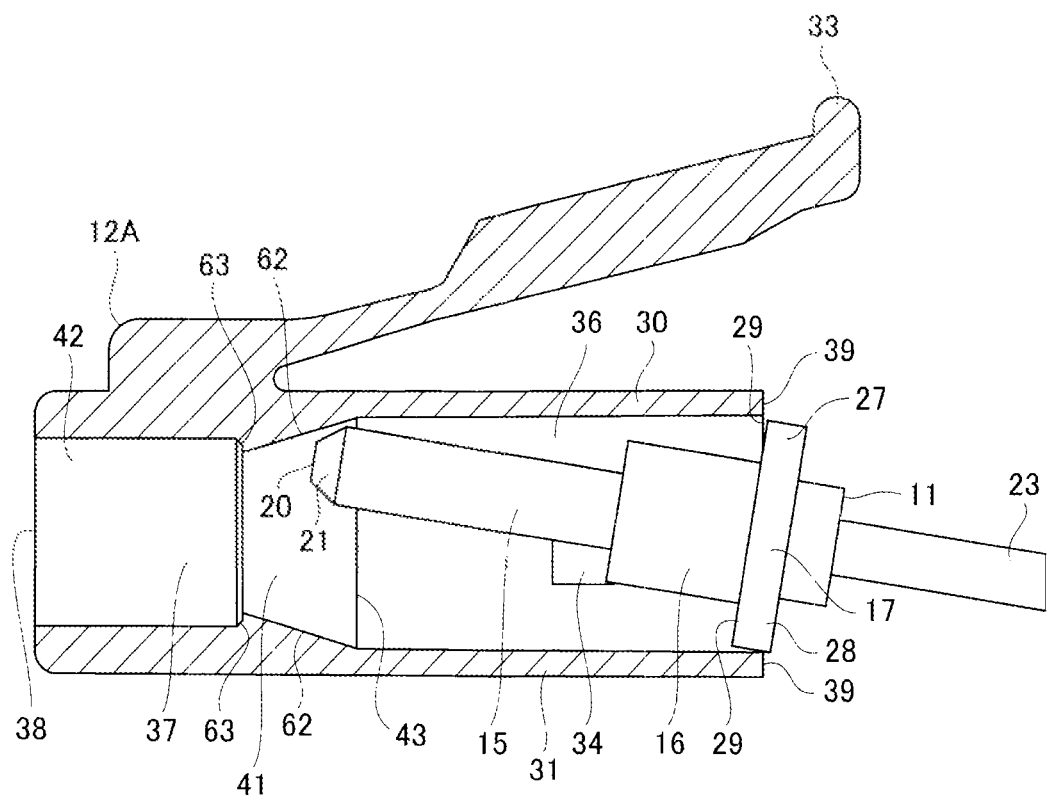
FIG. 23 is a section view similar to FIG. 14 showing another example of the ferrule and the plug frame in the assembly process of the optical connector plug.
Figure 24:
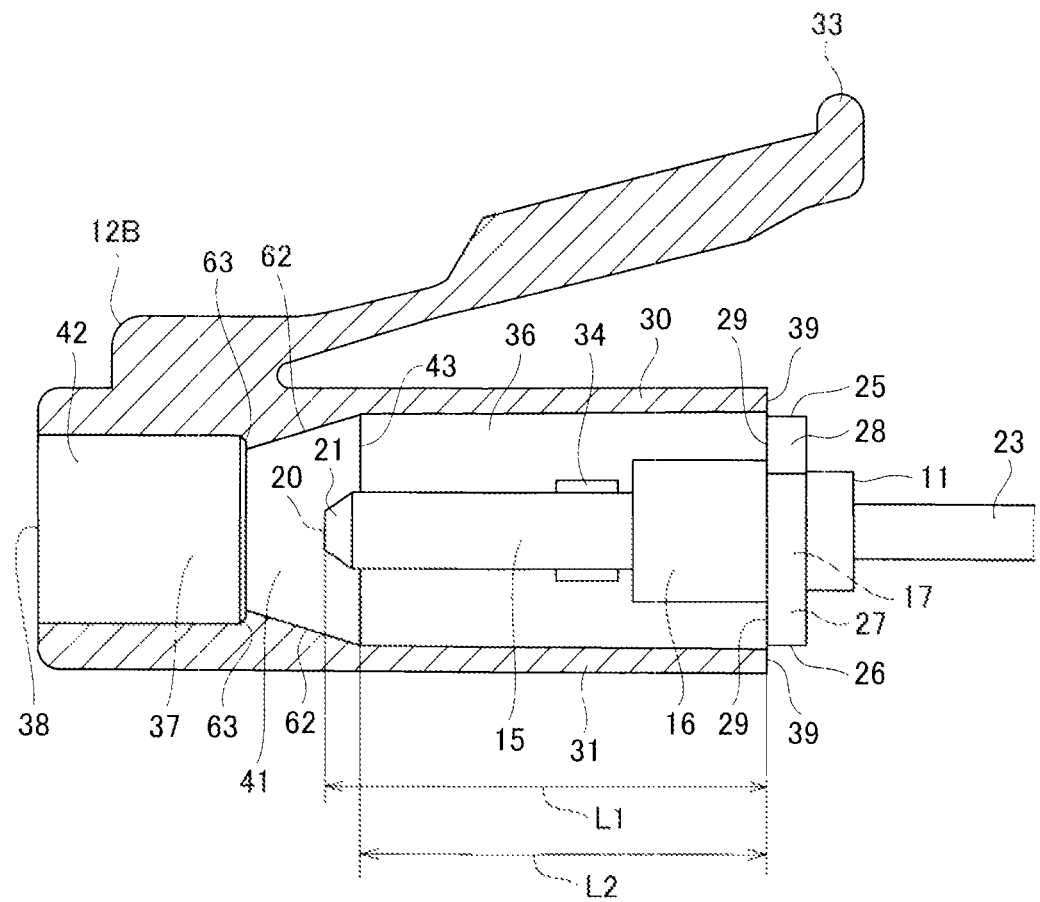
FIG. 24 is a section view similar to FIG. 17 showing another example of the ferrule and the plug frame in the assembly process of the optical connector plug.

FIG. 19 is a section view of the optical connector plug 10B similarly to FIG. 3 to show another example, FIG. 20 is a perspective rear view of a plug frame 12B shown as another example. FIG. 21 is a rear view of the plug frame 12B, FIG. 22 is a section view along VI-VI line in FIG. 21. FIG. 23 is a section view similarly to FIG. 14 to show another example of the ferrule 11 and the plug frame 12B in the assembly process of the optical connector plug 10B, and FIG. 24 is a section view similarly to FIG. 17 to show another example of the ferrule 11 and the plug frame 12B in the assembly process of the optical connector plug 10B. In FIG. 19, the axial direction is indicated by an arrow A, and the vertical direction is indicated by an arrow B.

The difference of the optical connector plug 10B from that of FIG. 1 is that an inclined portion 62 is formed in the second accommodation space 37 of the plug frame 12B, and the other configurations are equal to those of the optical connector plug 10A of FIG. 1, accordingly, detailed descriptions on the other configuration of the optical connector plug 10B are omitted.

The optical connector plug 10B is formed of the ferrule 11, the plug frame 12B, and the stop ring 13, the spring 14 and the boot 59. The ferrule 11, the stop ring 13, the spring 14 and the boot 59 are equal to those of the optical connector plug 10A of FIG. 1, respectively. Further, the length L1 from the end face 20 of the capillary 15 of the ferrule 11 to the front end surface 29 of the flange 17 in the axial direction is larger than 7 mm, and preferably between 7.0 and 7.3 mm, similarly to that in FIG. 1.

The plug frame 12B includes the insertion port 35, the first and second accommodation spaces 36 and 37 that are surrounded by the top wall 30, the bottom wall 31 and the two side walls 32, and the opening 38. The shape of the insertion port 35 and the cross sectional shape of the first accommodation space 36 are equal to those of the plug frame 12A, respectively. The cross sectional shapes of the engagement space 41 and the insertion space 42 of the second accommodation, space 37 are equal to those of the plug frame 12A, respectively.

At the rearward portion of the second accommodation space 37 in the axial direction, the flange contact surface 45 which extends inward in the radial direction from the front end 43 of the forward portion of the first accommodation space 36 in the axial direction is formed (refer to FIG. 20 and FIG. 21). In the engagement space 41 of the second, accommodation space 37 of the plug frame 12B, an inclined portion 62 which extends between the front end 43 of the forward portion of the first accommodation space 36 and the front end 63 of the forward portion of the engagement space 41 of the second accommodation space 37 in the axial direction is formed.

The inclined portion 62 is inclined gradually inward in the radial direction toward the forward portion in the axial direction (from the front end 43 of the forward portion of the first accommodation space 36 toward the front end of the forward portion of the engagement space 41 of the second accommodation space 37 in the axial direction).

The length L2 from the front end 43 (flange contact surface 45) of the forward portion of the first accommodation space 36 of the plug frame 12B to the rear end surface 39 (insertion port 35) of the rearward portion of the plug frame 12B in the axial direction is smaller than 7 mm, and preferably between 6.5 and 6.8 mm, similarly to that of FIG. 1. The length L1 from the end face 20 of the capillary 15 of the ferrule 11 to the front end surface 29 of the flange 17 in the axial direction is larger (longer) than the length L2 from the front end 43 (flange contact surface 45) of the forward portion of the first accommodation space 36 of the plug frame 12B to the rear end surface 39 (insertion port 35) of the rearward portion of the plug frame 12B in the axial direction, that is, L1>L2 (refer to FIG. 24).

As for the assembly procedure of this optical connector plug 10B, similarly to that, for the optical connector plug 10A of FIG. 1, first, the ferrule 11 is accommodated in the plug frame 12B. At a time when the ferrule 11 is inserted in the plug frame 12B, the flange 17 can be fitted (set in) to the first accommodation space 36 when the shape of the flange 17 matches with the cross-sectional shape of the first accommodation space 36 of the plug frame 12B in the axial direction, and the flange 17 is opposed to the first accommodation space 36 so as to be entered therein.

In a state in which the capillary 15 inserted from the insertion port 35 of the plug frame 12B is moved forward in the axial direction, only the capillary 15 is accommodated in the first accommodation space 36, and the flange 17 of the ferrule 11 is not accommodated in the first accommodation space 36, the ferrule 11 can be rotated about the axis.

In the state of FIG. 23 in which the upper edge 25 of the flange 17 is positioned on the side of the bottom wall 31 of the plug frame 12B, and the lower edge 26 of the flange 17 is positioned on the side of the top wall 30 of the plug frame 12B, the cross sectional shape of the first accommodation space 36 does not match with the shape of the flange 17 of the ferrule 11 in the axial direction, and the flange 17 is not opposed to the first accommodation space 36 so as to be entered therein, therefore, it is not possible to fit (set in) the flange 17 to the first accommodation space 36.

When the upper edge 25 of the flange 17 slightly enters the first accommodation space 36 of the plug frame 12B, and the front end surface 29 of the flange 17 is in contact with the rear end surface 39 of the plug frame 12B while being inclined (the front end surface 29 is in contact with the rear end surface 39 in a non-parallel condition), as shown in FIG. 23, the capillary 15 of the ferrule 11 (including the sleeve 16) is inclined in an upward slope (turning in the radial direction) from the first accommodation space 36 toward the second accommodation space 37.

The length L1 from the end face 20 of the capillary 15 of the ferrule 11 to the front end surface 29 of the flange 17 in the axial direction is larger than the length L2 from the front end 43 of the forward portion of the first accommodation space 36 of the plug frame 12B to the rear end surface 39 of the rearward portion of the plug frame 12B (insertion port 35) in the axial direction, accordingly, when the capillary 15 is inclined in an upward slope, the end face 20 and the chamfered portion 21 of the capillary 15 are located in the inclined portion 62 of the second accommodation space 37.

Accordingly, when the capillary 15 is inclined in the upward slope, the end face 20 of the capillary 15 cannot be in contact with the flange contact surface 45 of the plug frame 12B and the inclined portion 62 of the second accommodation space 37.

In the state of FIG. 24 in which when the flange 17 of the ferrule 11 is rotated clockwise or counter-clockwise direction from the state of FIG. 23, the upper edge 25 of the flange 17 is positioned on the side of the top wall 30 of the plug frame 12B, the lower edge 26 of the flange 17 is positioned on the side of the bottom wall 31 of the plug frame 12B, and two side edges 27 of the flange 17 are positioned on the sides of the two side walls 32 of the plug frame 12B, the shape of the flange 17 matches with the cross sectional shape of the first accommodation space 36 of the plug frame 12B to face in the axial direction, and the flange 17 is opposed to the first, accommodation space 36 so as to be entered therein, accordingly, it is possible to fit (set in) the flange 17 to the first accommodation space 36.

In the state in which the positional relationship around the axis between the ferrule 11 and the plug frame 12B that face to each other is the state shown in FIG. 24, and the front end surface 29 of the flange 17 is in contact with the rear end surface 39 of the plug frame 12B in a flat condition (the rear end surface 39 is parallel to the front end surface 29), the capillary 15 is extending straightly in the axial direction, the end face 20 and the chamfered portion 21 of the capillary 15 are located in the inclined portion 62 of the second accommodation space 37.

When the ferrule 11 is moved forward in the axial direction in the state in which the upper edge 25 of the flange 17 of the ferrule 11 is positioned on the side of the top wall 30 of the plug frame 12B, the lower edge 26 of the flange 17 is positioned on the side of the bottom wall 31 of the plug frame 12B, and two side edges 27 of the flange 17 are positioned on the sides of the two side walls 32 of the plug frame 12B, respectively, the flange 17 is fitted (entered) to the first accommodation space 36 from the insertion port 35.

When the flange 17 is fitted to the first accommodation space 36, similarly to the optical connector plug 10A of FIG. 1, the rotation of the ferrule 11 around the axis is prevented by the top wall 30 and the bottom wall 31 and the two side walls 32 of the plug frame 12B which extend in a first accommodation space 36 so that the ferrule 11 (flange 17) cannot be rotated in the first accommodation space 36.

Since a gap (clearance) is formed between the inner peripheral surface of the first accommodation space 36 of the plug frame 12B and the outer peripheral edge of the flange 17 of the ferrule 11 fitted to the first accommodation space 36, the flange 17 of the ferrule 11 of polygonal shape can be inserted smoothly into the first accommodation space 36 of the plug frame 12B of polygonal shape, after insertion of the ferrule 11 into the plug frame 12B, the flange 17 can be moved (moving forward and backward) smoothly in the axial direction in the first accommodation space 36.

When the ferrule 11 is moved forward in the axial direction after the flange 17 is inserted into the first accommodation space 36, the capillary 15 of the ferrule 11 passes through the engagement space 41 of the second accommodation space 37 and enters in the insertion space 42, and the sleeve 16 of the ferrule 11 enters the engagement space 41 of the second accommodation space 37. When the sleeve 16 enters in the engagement space 41, the front end surface 29 of the flange 17 is in contact with the flange contact surface 45 which is located at the front end 43 of the forward portion of the first accommodation space 36 in the axial direction, accordingly, further forward movement of the front ferrule 11 in the axial direction is stopped.

When the ferrule 11 is inserted to the plug frame 12B, and the front end surface 29 of the flange 17 is in contact with the flange contact surface 45, as shown in FIG. 19, the front end 61 of the capillary 15 including the end face 20 and the chamfered portion 21 is exposed forward in the axial direction from the opening 38, the main body of the capillary 15 is positioned in the insertion space 42, and the sleeve 16 is positioned in the engagement space 41. The assembly procedure of the optical connector plug JOB after the insertion of the ferrule 11 to the plug frame 12B is similar to that of the optical connector plug 10A of FIG. 1, accordingly, the description thereof is omitted.

In the optical connector plug 10B, the length L1 from the end face 20 of the capillary 15 of the ferrule 11 to the front end surface 29 of the flange 17 in the axial direction is larger than the length L2 from, the front end 43 (flange contact surface 45) of the forward portion of the first accommodation space 36 of the plug frame 12B to the rear end surface 39 of the rearward portion of the plug frame 12B in the axial direction, in the state in which the front end surface 29 of the flange 17 is in contact with the rear end surface 39 of the plug frame 12B which extends in the insertion port 35, the end face 20 and the chamfered portion 21 of the capillary 15 are located in the second accommodation space 37 beyond the flange contact surface 45 (second accommodation space 37 which extends in the immediate front portion of the flange contact surface 45), accordingly, when the ferrule 11 is inserted into the plug frame 12B, the end face 20 and the chamfered portion 21 of the capillary 15 cannot come in contact with the front end 43 of the forward portion of the first accommodation space 36 (flange contact surface 45) in the axial direction, therefore, it is possible to insert the ferrule 11 into the plug frame 12B smoothly, consequently, the flange 17 of the ferrule 11 can be accommodated easily in the first accommodation space 36 and the capillary 15 of the ferrule 11 can be accommodated easily in the second accommodation space 37.

In the optical connector plug 10B, since the ferrule 11 can be inserted smoothly into the plug frame 12B, the optical connector plug 10B formed of the ferrule 11, the plug frame 12B, the stop ring 13, and the spring 14 can be assembled in a short time without requiring effort in the construction, field of the optical fiber 19, consequently, it is possible to perform the optical connection work of the optical fiber 19 efficiently.

In the optical connector plug 10B, when the capillary 15 is turned in the radial direction in a state in which the front end surface 29 of the flange 17 is in contact with the rear end surface 39 of the plug frame 12B which extends to the insertion port 35, the main body of the capillary 15 is in contact with the inclined portion 62 of the second accommodation space 37, and the end face 20 and the chamfered portion 21 of the capillary 15 cannot not be in contact with the flange contact surface 45 and the inner peripheral surface of the plug frame 12B directly, therefore, it is possible to prevent the end surface of the optical fiber 19 and the end face 20 and the chamfered portion 21 of the capillary 15 from scratching.

In the optical connector plug 10B, when the ferrule 11 is inserted in the plug frame 12B, and the planar shape of the flange 17 in the axial direction matches with the cross sectional shape of the first accommodation space 36 in the axial direction to face, and the flange 17 is opposed to the first accommodation space 36 so as to be entered therein, the flange 17 can be fitted to the first accommodation space 36 so that the flange 17 can be moved in the axial direction and cannot be rotated about the axis, accordingly, the position around the axis of the ferrule 11 is necessarily determined with respect to the plug frame 12B by inserting the flange 17 of the ferrule 11 into the first accommodation space 36, therefore, the positioning around the axis of the ferrule 11 to the plug frame 12B can be performed easily, consequently, it is possible to assemble the optical connector plug 10B in a short time without requiring effort.

In the optical connector plug 10B, when the flange 17 is fitted to the first accommodation space 36, the rotation around the axis of the flange 17 becomes disabled, therefore, it is possible to insert the ferrule 11 into the plug frame 12B in the state in which the position around the axis of the ferrule 11 is matched with respect to the plug frame 12B, while preventing the positional displacement around the axis of the ferrule 11 with respect to the plug frame 12B.

Numerous additional modifications and variations are possible in light of the above teachings. It is therefore to be understood that within the scope of the appended claims, the disclosure of this patent specification may be practiced otherwise than as specifically described herein.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical connector plug, comprising:
 a ferrule holding at least one optical fiber having a front end face and extending in an axial direction;
 a plug frame to accommodate the ferrule;
 a stop ring to engage with the plug frame; and
 a spring provided between the ferrule and the stop ring to bias the ferrule forward in the axial direction, wherein the ferrule includes:
  a capillary having a front end face in the axial direction, at which the front end face of the optical fiber is exposed; and a flange located at a rearward portion of the capillary in the axial direction and extending outward in a radial direction from the capillary, the plug frame includes:
- a rear end surface located at a rearward portion of the plug frame in the axial direction;
- an insertion port for inserting the ferrule, the insertion port being surrounded by the rear end surface;
- a first accommodation space for accommodating the flange and the spring, the first accommodation space extending forward in the axial direction from the insertion port and having a front end in the axial direction;
- a flange contact surface which comes in contact with a front end surface of the flange when the ferrule is inserted into the plug frame, the flange contact surface extending inward in the radial direction at the front end of the first accommodation space; and
- a second accommodation space for the capillary to be located, the second accommodation space extending from the front end of the first accommodation space to a front end of the plug frame in the axial direction, characterized in that, a length in the axial direction from the front end face of the capillary to the front end surface of the flange is larger than a length in the axial direction from the flange contact surface to the rear end surface of the plug frame, and a cross-sectional shape of the first accommodation space is substantially the same as the shape of the flange, the flange is fitted to the first accommodation space so that the flange can be moved in the axial direction and cannot be rotated around the axis.

2. The optical connector plug according to claim 1, wherein both the shape of the flange and the cross-sectional shape of the first accommodation space are polygon.

3. The optical connector plug according to claim 2, wherein both in the polygonal shape of the flange and the polygonal cross-sectional shape of the first accommodation space, at least one corner is chamfered.

4. The optical connector plug according to claim 1, wherein both the shape of the flange and the cross-sectional shape of the first accommodation space are quadrilateral.

5. The optical connector plug according to claim 4, wherein both in the quadrilateral shape of the flange and the quadrilateral cross-sectional shape of the first accommodation space of the plug frame, at least one corner is chamfered.

* * * * *